(12) United States Patent
Kubota

(10) Patent No.: US 11,481,167 B2
(45) Date of Patent: Oct. 25, 2022

(54) PRINTING APPARATUS FOR INVALIDATING AN AUTOMATIC PRINTING FUNCTION, CONTROL METHOD AND STORAGE MEDIUM

(71) Applicant: CANON KABUSHIKI KAISHA, Tokyo (JP)

(72) Inventor: Tomohide Kubota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,596

(22) Filed: Dec. 2, 2021

(65) Prior Publication Data
US 2022/0091803 A1 Mar. 24, 2022

Related U.S. Application Data

(63) Continuation of application No. 16/653,003, filed on Oct. 15, 2019, now Pat. No. 11,216,226.

(30) Foreign Application Priority Data

Oct. 30, 2018 (JP) .............................. JP2018-203963

(51) Int. Cl.
*G06F 3/12* (2006.01)

(52) U.S. Cl.
CPC .......... *G06F 3/1238* (2013.01); *G06F 3/1222* (2013.01); *G06F 3/1258* (2013.01)

(58) Field of Classification Search
CPC .... G06F 3/1238; G06F 3/1222; G06F 3/1258; G06F 3/1255
See application file for complete search history.

(56) References Cited

U.S. PATENT DOCUMENTS

| 10,691,384 | B2 * | 6/2020 | Kaneko | .................. H04N 1/444 |
| 2004/0213615 | A1 * | 10/2004 | Nakao | .................. G06F 21/608 400/76 |

(Continued)

FOREIGN PATENT DOCUMENTS

| JP | 2009171331 A | 7/2009 |
| JP | 2011223180 A | 11/2011 |

(Continued)

OTHER PUBLICATIONS

Office Action issued in U.S. Appl. No. 16/653,003 dated Oct. 1, 2020.

(Continued)

*Primary Examiner* — Benjamin O Dulaney
(74) *Attorney, Agent, or Firm* — Rossi, Kimms & McDowell LLP

(57) ABSTRACT

A printing apparatus including: a memory storing instructions; and a processor which is capable of executing the instructions causing the printing apparatus to: receive print data; save the received print data; authenticate a user; hold a setting of valid or invalid of an automatic printing function to perform printing processing of print data associated with the user without instructions from the user in response to authentication of the user; and control for making invalid the setting of the automatic printing function is performed, in a case where a setting of a predetermined function that needs to limit the use of the automatic printing function is performed.

6 Claims, 27 Drawing Sheets

(56) References Cited

U.S. PATENT DOCUMENTS

| | | | | |
|---|---|---|---|---|
| 2011/0085805 A1* | 4/2011 | Yamaguchi | ............ | G06F 21/608 |
| | | | | 399/8 |
| 2017/0264786 A1* | 9/2017 | Nishida | ................ | G06F 3/1285 |
| 2017/0371601 A1* | 12/2017 | Kaneko | .............. | H04N 1/32363 |
| 2019/0361635 A1* | 11/2019 | Kawanishi | ............ | G06F 3/1204 |
| 2020/0104080 A1* | 4/2020 | Maruyama | ............ | G06F 3/1238 |

FOREIGN PATENT DOCUMENTS

| | | |
|---|---|---|
| JP | 2017228971 A | 12/2017 |
| JP | 2018151706 A | 9/2018 |

OTHER PUBLICATIONS

Office Action issued in U.S. Appl. No. 16/653,003 dated Apr. 15, 2021.

Notice of Allowance issued in U.S. Appl. No. 16/653,003 dated Sep. 7, 2021.

Office Action issued in Japanese Appln. No. 2018-203963 dated May 17, 2022. English translation provided.

\* cited by examiner

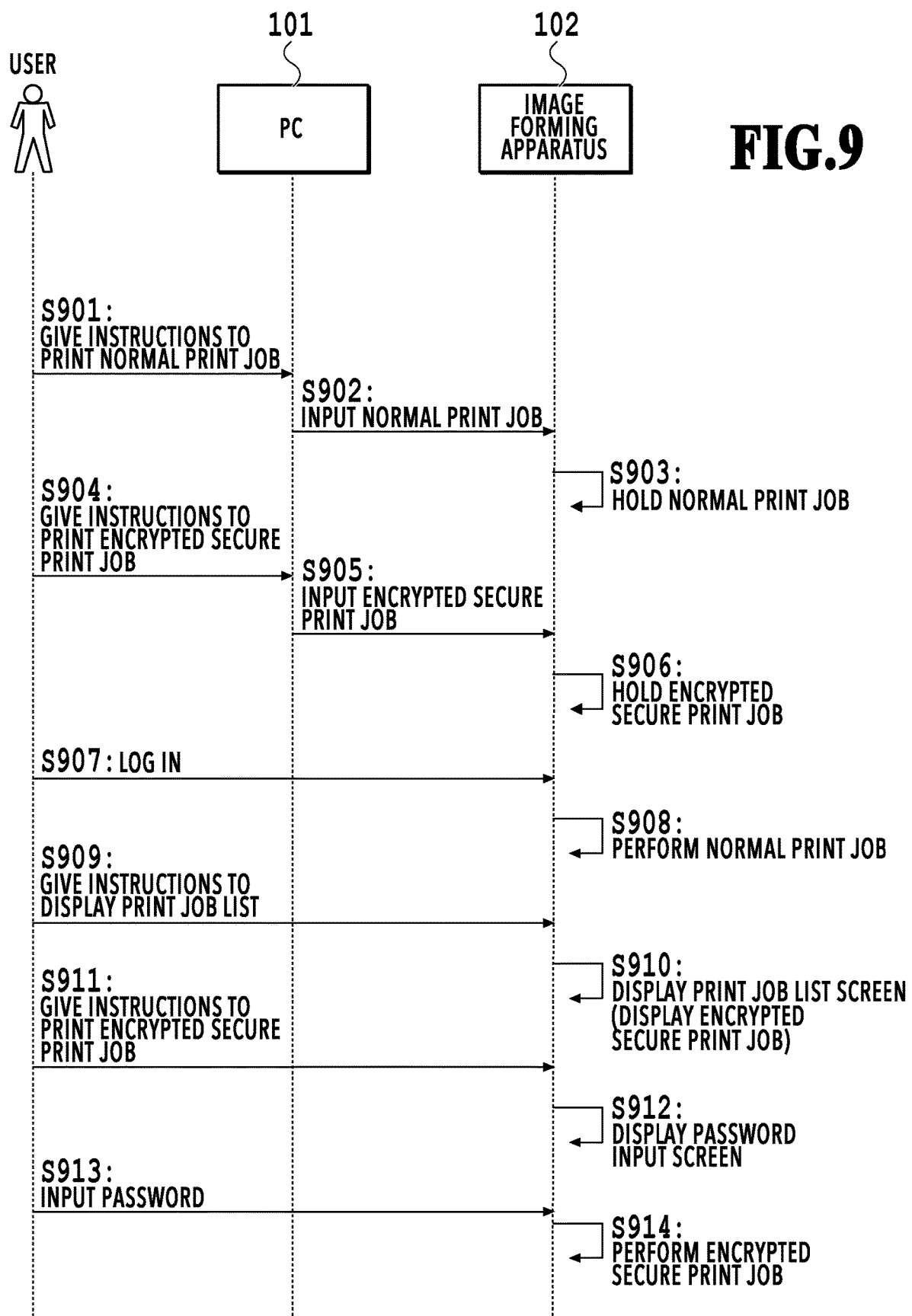

FIG.10

Select a job.

| | Wait for print | Already-printed | Reserved print | Update |

1000

| Job name/Print setting | Date | Number of sheets × Number of copies | Job type | User name |
|---|---|---|---|---|
| AAA.txt<br>single-side monochrome | 2018/5/22<br>10:34:45 | 20x1 | | User1 |
| BBB.pdf<br>double-side color | 2018/5/22<br>13:50:22 | 10x3 | | User1 |
| CCC.docx<br>double-side 2 in 1 color | 2018/5/22<br>14:10:00 | 32x5 | secure | User1 |
| DDD.docx<br>single-side color | 2018/5/22<br>14:12:00 | 32x3 | secure | User1 |

1001  1002  1003  1004

☐ Select all

Number of selected jobs:0
Total:4

| Print setting | Image display | Job delete | Print suspend | Print start |

Log out

FIG.11

| Select a job. | | | | | |
|---|---|---|---|---|---|
| | | Wait for print | Already-printed | Reserved print | Update |
| Job name/Print setting | Date | Number of sheets × Number of copies | Job type | User name | |
| CCC.docx double-side 2 in 1 color | 2018/5/22 14:10:00 | 32×5 | secure | User1 | |
| DDD.docx single-side color | 2018/5/22 14:12:00 | 32×3 | secure | User1 | |

☐ Select all

Number of selected jobs: 0
Total: 2

| Print setting | Image display | Job delete | Print suspend | Print start | Log out |

Select a job.

| Job name/Print setting | Date | Wait for print | Number of sheets × Number of copies | Already-printed | Job type | Reserved print | User name | Update |
|---|---|---|---|---|---|---|---|---|
| | | | | | | | | |

☐ Select all

Number of selected jobs: 0
Total: 0

| Print setting | Image display | Job delete | Print suspend | Print start |
|---|---|---|---|---|

Log out

1301 — Setting to receive only encrypted secure print job

1302 — ON  
1303 — OFF  
1304 / 1305 — Cancel / OK

FIG.13B

1306 — Setting to receive only encrypted secure print job  
1307 — 0:OFF  
1308 — 1:ON

FIG.13C

1311 — Setting to receive only shared print job

1312 — ON  
1313 — OFF  
1314 / 1315 — Cancel / OK

FIG.13D

1316 — Setting to receive only shared print job  
1317 — 0:OFF  
1318 — 1:ON

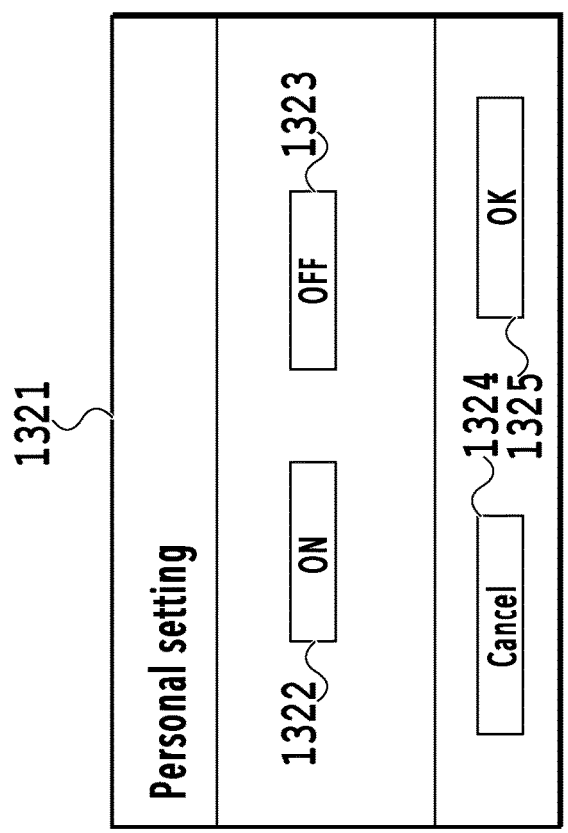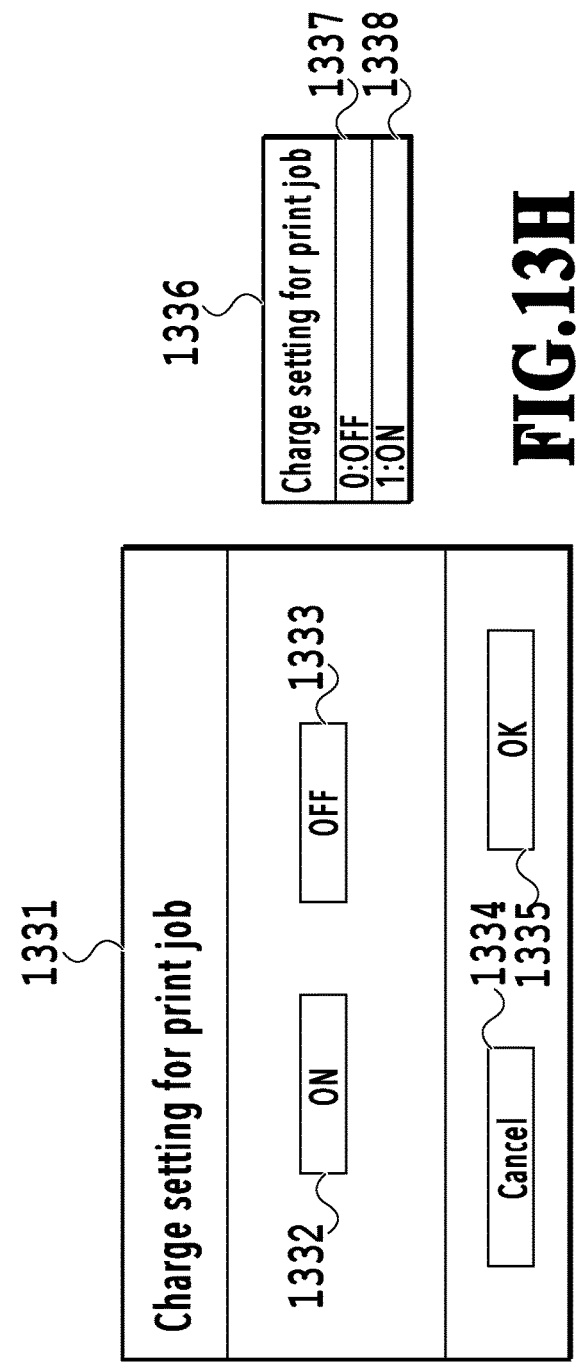

Bibliographic information list — 2001

| Date | User name | Storage location | Print job name | Print setting | Print job type | Password |
|---|---|---|---|---|---|---|
| 2018/5/22 10:34:45 | User1 | /data/User1/doc1 | AAA.txt | single-side one copy monochrome | normal print job | |
| 2018/5/22 13:50:22 | User1 | /data/User1/doc2 | BBB.pdf | double-side three copies color | normal print job | |
| 2018/5/22 14:10:00 | User1 | /data/User1/doc3 | CCC.docx | double-side five copies 2 in 1 color | encrypted secure print job | 111 |
| 2018/5/22 14:12:00 | User1 | /data/User1/doc4 | DDD.docx | single-side three copies color | encrypted secure print job | 222 |
| 2018/5/22 14:15:00 | User2 | /data/User2/doc1 | EEE.docx | single-side three copies color | normal print job | |
| 2018/5/22 14:16:00 | User2 | /data/User2/doc2 | FFF.docx | single-side three copies color | encrypted secure print job | 333 |
| 2018/5/22 15:30:00 | User2 | /data/User2/doc3 | GGG.docx | single-side three copies color | normal print job | |
| 2018/5/22 15:30:00 | User2 | /data/User2/doc4 | HHH.docx | single-side three copies color | encrypted secure print job | 444 |

FIG.20

PRINTING APPARATUS FOR INVALIDATING AN AUTOMATIC PRINTING FUNCTION, CONTROL METHOD AND STORAGE MEDIUM

BACKGROUND OF THE INVENTION

Field of the Invention

The present disclosure relates to a printing apparatus capable of hold printing in which a print job is held temporarily, a control method, and a storage medium.

Description of the Related Art

In recent years, in an image forming apparatus, a print job input from a printer driver is stored in a hard disk and among the stored print jobs, a print job selected by an authenticated user is performed (that is, hold printing is performed).

Here, Japanese Patent Laid-Open No. 2011-223180 has proposed an image forming apparatus that automatically performs, in a case where a user is authenticated and a print job of the authenticated user is held, the print job by omitting the selection operation by the user. That is, an image forming apparatus that performs post-authentication automatic printing has been proposed.

However, the recent image forming apparatus includes a variety of functions, and therefore, it is necessary to take care of the contending operation with those functions at the time of performing the post-authentication automatic printing. For example, there is a function to display a warning on the condition that the number of sheets to be printed is larger than the predetermined number of sheets at the time of performing printing, and in a case where this function is valid, on a condition that the number of sheets to be printed is large, a warning is displayed immediately after the start of the post-authentication automatic printing and the operation is required to be performed again, and therefore, there is a possibility that the operability of a user is reduced on the contrary.

SUMMARY OF THE INVENTION

The present disclosure has been made in view of the conventional problems described previously and an object thereof is to improve the operability of a user in post-authentication automatic printing of hold printing.

The present disclosure is a printing apparatus including: a memory storing instructions; and a processor which is capable of executing the instructions causing the printing apparatus to: receive print data; save the received print data; authenticate a user; hold a setting of valid or invalid of an automatic printing function to perform printing processing of print data associated with the user without instructions from the user in response to authentication of the user; and control for making invalid the setting of the automatic printing function is performed, in a case where a setting of a predetermined function that needs to limit the use of the automatic printing function is performed.

Further features of the present invention will become apparent from the following description of exemplary embodiments with reference to the attached drawings.

BRIEF DESCRIPTION OF THE DRAWINGS

FIG. 9 is a diagram showing a storage sequence of a print job at the time of the forcible hold setting and an automatic printing sequence after user authentication of a print job;
FIG. 10 is a diagram showing a print job list screen;
FIG. 11 is a diagram showing a print job list screen;
FIG. 12 is a diagram showing a print job list screen;
FIG. 13A, FIG. 13C, FIG. 13E, FIG. 13G, FIG. 13I, and FIG. 13K are each a diagram showing a setting screen of a setting that needs to limit the use of the post-authentication automatic printing function
and FIG. 13B, FIG. 13D, FIG. 13F, FIG. 13H, FIG. 13J, and FIG. 13L are each a diagram showing a table that manages setting values;
FIG. 20 is a diagram showing a bibliographic information list.

DESCRIPTION OF THE EMBODIMENTS

Figure 1:
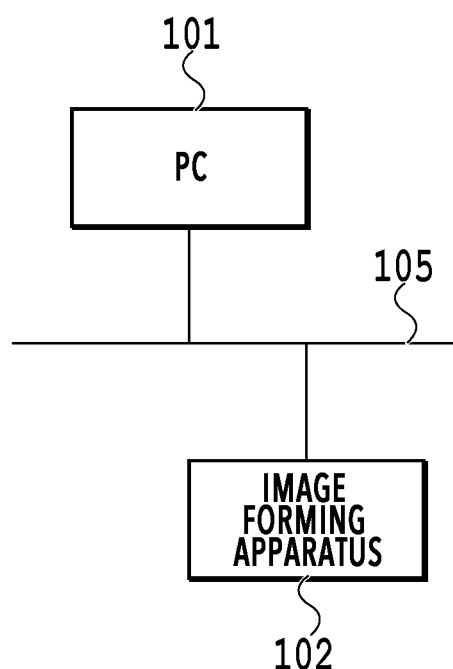
FIG. 1 is a diagram showing an image forming apparatus.

In the following, embodiments of the present invention are explained with reference to the drawings. The following embodiments are not intended to limit the present invention and all combinations of features explained in the present embodiments are not necessarily indispensable to the solution of the present invention. In addition, a variety of aspects within the scope not deviating from the gist of the present invention are also included in the present invention and it is also possible to appropriately combine a part of the following embodiments.

First Embodiment

An image forming apparatus according to the present embodiment includes mainly, as its functions, a hold printing function, a post-authentication automatic printing function, and a setting value exclusion function. In the following, supplemental explanation is given first for these functions.

First, the hold printing function is a function to store a received print job in an auxiliary storage device and hold the print job. In a case of storing a print job, the image forming apparatus manages print data included in the print job and bibliographic information relating to the print job (for example, information, such as a user name, a storage location of the print job, a name of the print job, print setting, and type of the print job).

Print jobs that are held include a normal print job whose data is not encrypted and an encrypted secure print job whose data is encrypted. In order to decode (print) an encrypted secure print job, a predetermined password is necessary.

Next, the post-authentication automatic printing function is a function to automatically perform, in a case where a user is authenticated in the image forming apparatus, a held normal print job relating to the authenticated user (that is, automatic printing processing function). The encrypted secure print job is not the target of execution of post-authentication automatic printing, and therefore, even though a user is authenticated, the job is not performed automatically. Further, in such a case, the image forming apparatus displays bibliographic information associated with the authenticated user in a list on the operation unit and further, in a case where bibliographic information is selected by a user and the password is authenticated, the image forming apparatus performs the encrypted secure print job corresponding to the selected bibliographic information.

Further, the setting value exclusion function is a function to control, in a case where a setting value that limits the post-authentication automatic printing is set valid, a setting value for setting whether or not to perform post-authentication automatic printing. This function will be explained by using, for example, FIG. 14, to be described later, or the like.

The image forming apparatus according to the present embodiment improves the operability of a user by combining these functions and appropriately controlling the operation of the post-authentication automatic printing function (for example, in a case where post-authentication automatic printing is not necessary, by performing control so as to prevent the post-authentication automatic printing function from operating).

FIG. 1 is a diagram showing an image forming apparatus 102 according to the present embodiment. The image forming apparatus 102 processes a print job input from a PC (Personal Computer) 101 connected via a network 105, such as a LAN (Local Area Network). Further, the image forming apparatus 102 manages bibliographic information for uniquely specifying a print job input from the PC 101.

The number of PCs and image forming apparatuses connected to the network is not necessarily limited to this. Further, in the present embodiment, the source from which a print job is input is the PC 101, but the source may be a device (for example, a portable terminal, another image forming apparatus, and the like) other than the PC 101.

Figure 2:
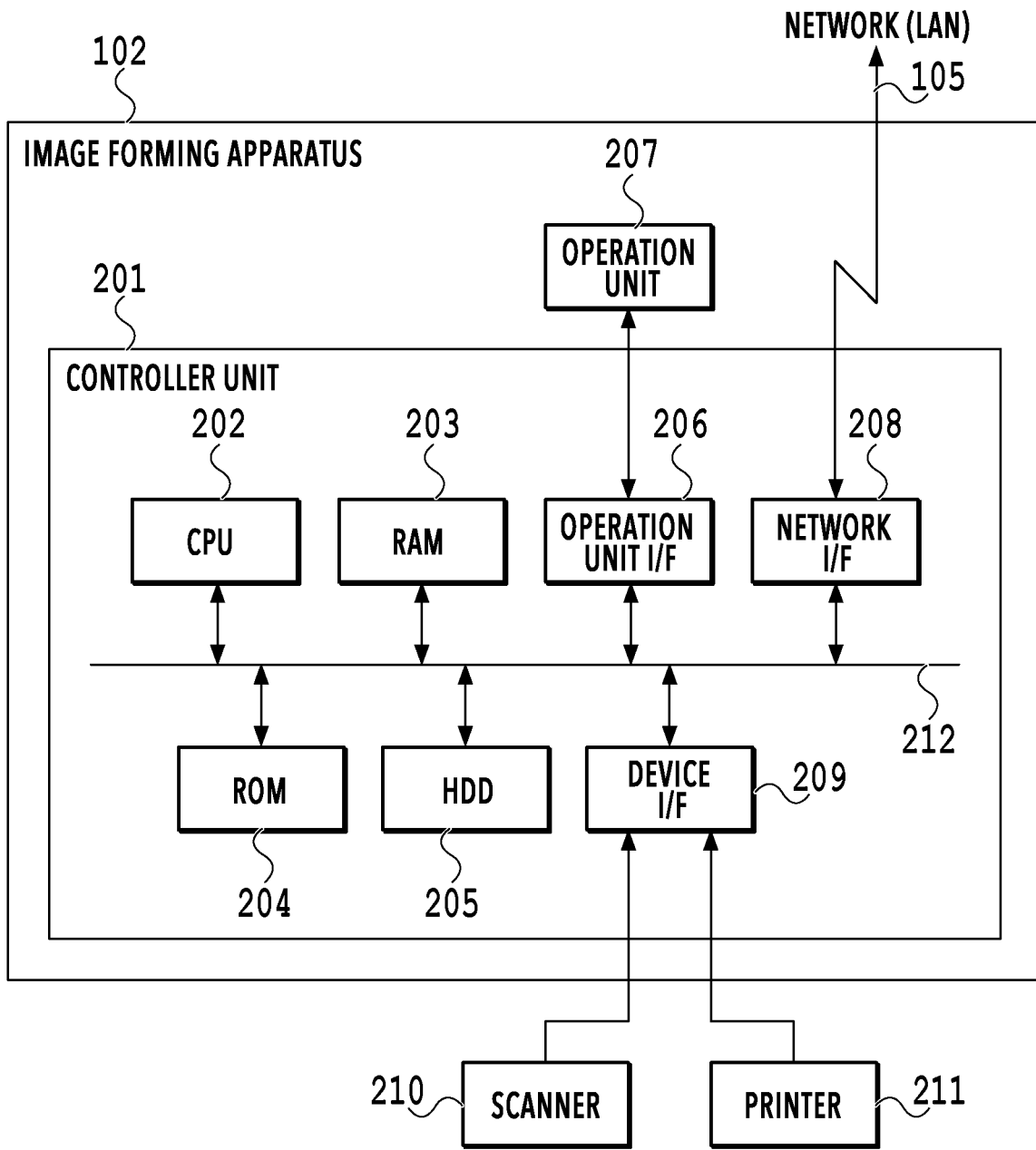
FIG. 2 is a block diagram showing a hardware configuration of the image forming apparatus.

FIG. 2 is a block diagram showing the hardware configuration of the image forming apparatus 102. The image forming apparatus 102 includes a controller unit 201 and an operation unit 207. Further, the controller unit 201 has a CPU 202, a RAM 203, a ROM 204, a hard disk drive (HDD) 205, an operation unit I/F (interface) 206, a network I/F 208, and a device I/F 209.

The CPU (Central Processing Unit) 202 is a computing device that controls the entire image forming apparatus. The RAM (Random Access Memory) 203 is a volatile memory and used as a system work memory for the CPU 202 to operate and used as an image memory for temporarily store image data. In addition, in the RAM 203, programs, such as an operating system, system software, and application software, and data are arranged. The ROM (Read Only Memory) 204 stores a boot program of the system.

The HDD 205 stores an operating system, system software, application software, image data, setting data, and the like. The operation unit I/F 206 is an interface unit with the operation unit 207 and outputs information that is displayed on the operation unit 207 to the operation unit 207. Further, the operation unit I/F 206 receives information input by a user from the operation unit 207.

The network I/F 208 is connected to the network 105 and inputs and outputs information to and from the PC 101 or another image forming apparatus connected on the network 105. The device I/F 209 connects a scanner 210, which is an image input device, and a printer 211, which is an image output device, to the controller unit 201 and inputs and outputs image data. The above blocks are arranged on a system bus 212. Further, the operation unit 207 includes, for example, a touch panel and the like and outputs the operations (various settings) performed by an administrator and a user to the controller unit 201.

Figure 3:
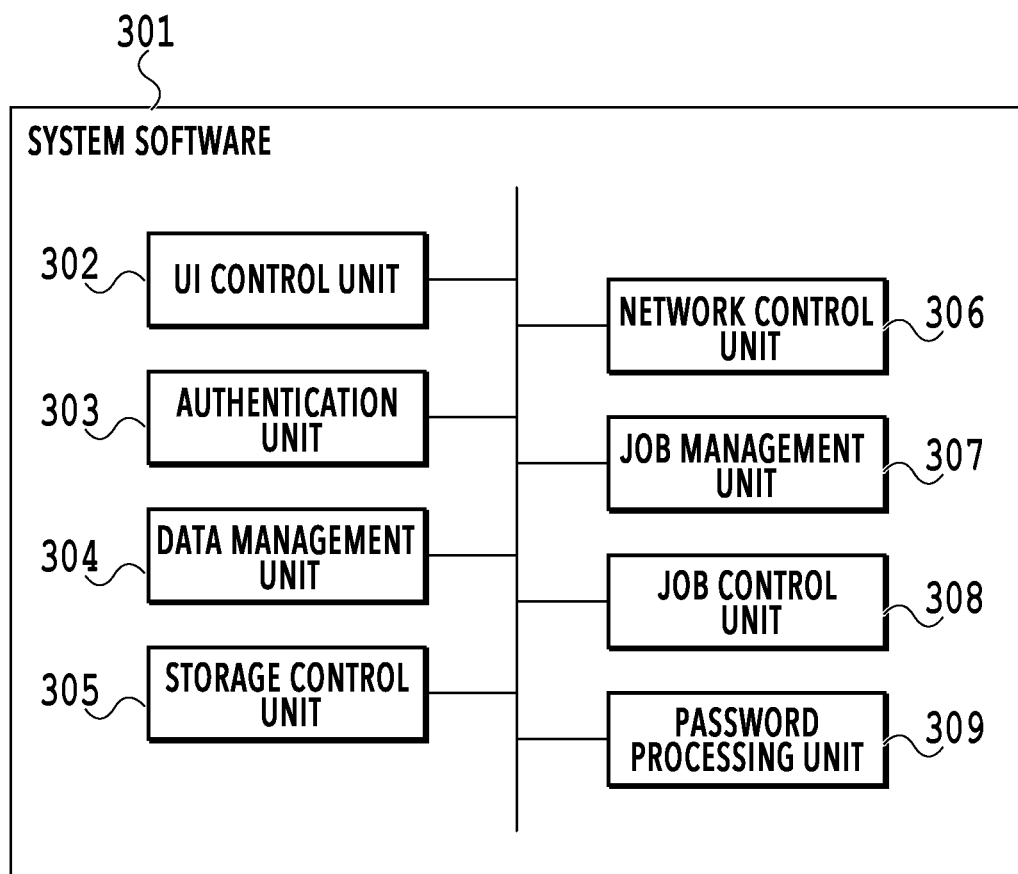
FIG. 3 is a block diagram showing a software configuration of the image forming apparatus.

FIG. 3 is a block diagram showing the software configuration of the image forming apparatus 102. System software 301 is stored in the storage unit, such as the RAM 203, the ROM 204, and the HDD 205, and executed by the CPU 202. Further, the system software 301 includes a UI control unit 302, an authentication unit 303, a data management unit 304, a storage control unit 305, a network control unit 306, a job management unit 307, a job control unit 308, and a password processing unit 309.

The UI (User Interface) control unit 302 receives the information that a user inputs by using the operation unit 207 via the operation unit I/F 206 and transmits the information to the authentication unit 303, the data management unit 304, and the job management unit 307. Further, the UI control unit 302 receives responses from the authentication unit 303, the data management unit 304, and the job management unit 307 and outputs the information to the operation unit 207 via the operation unit I/F 206. That is, the UI control unit 302 performs display control based on the responses from the authentication unit 303, the data management unit 304, and the job management unit 307.

The authentication unit 303 performs user authentication processing based on the authentication information received from the UI control unit 302. The data management unit 304 receives data write requests from the UI control unit 302, the network control unit 306, and the job management unit 307 and transmits the data write requests to the storage control unit 305. Further, the data management unit 304 receives data read requests from the UI control unit 302, the network control unit 306, and the job management unit 307 and transmits the data read requests to the storage control unit 305. In addition, the data management unit 304 receives various responses from the storage control unit 305 and transmits the responses (information) to the UI control unit 302, the network control unit 306, and the job management unit 307.

Upon receipt of the data write request from the data management unit 304, the storage control unit 305 performs control so that data is written to the HDD 205 and upon receipt of the data read request from the data management unit 304, the storage control unit 305 performs control so that data is read from the HDD 205. The storage control unit 305 returns the control results of the write control or the read control to the data management unit 304.

The network control unit 306 receives requests from the PC 101 and another image forming apparatus connected on the network 105 via the network I/F 208. Then, the network control unit 306 requests the data management unit 304 and the job management unit 307 to perform processing in accordance with the received requests. Further, the network control unit 306 receives responses from the data management unit 304 and the job management unit 307 and transmits the responses (information) to the PC 101 and another image forming apparatus connected on the network 105 via the network I/F 208.

The job management unit 307 receives requests to perform a job from the UI control unit 302 and the network control unit 306. The job management unit 307 manages the job and requests the job control unit 308 to perform the job. Further, the job management unit 307 transmits a data write request or a data read request to the data management unit 304. In addition, the job management unit 307 receives responses from the data management unit 304 and the job control unit 308 and transmits the job state to the UI control unit 302 and the network control unit 306.

The job control unit 308 receives a request to perform a job from the job management unit 307 and controls the operations of the scanner 210 and the printer 211 via the device I/F 209. Further, the job control unit 308 receives the operating states of the scanner 210 and the printer 211 via the device I/F 209 and transmits the operating states to the job management unit 307. The password processing unit 309 decodes an encrypted secure print job by using the password received from a user on the operation unit 207.

Figure 4:
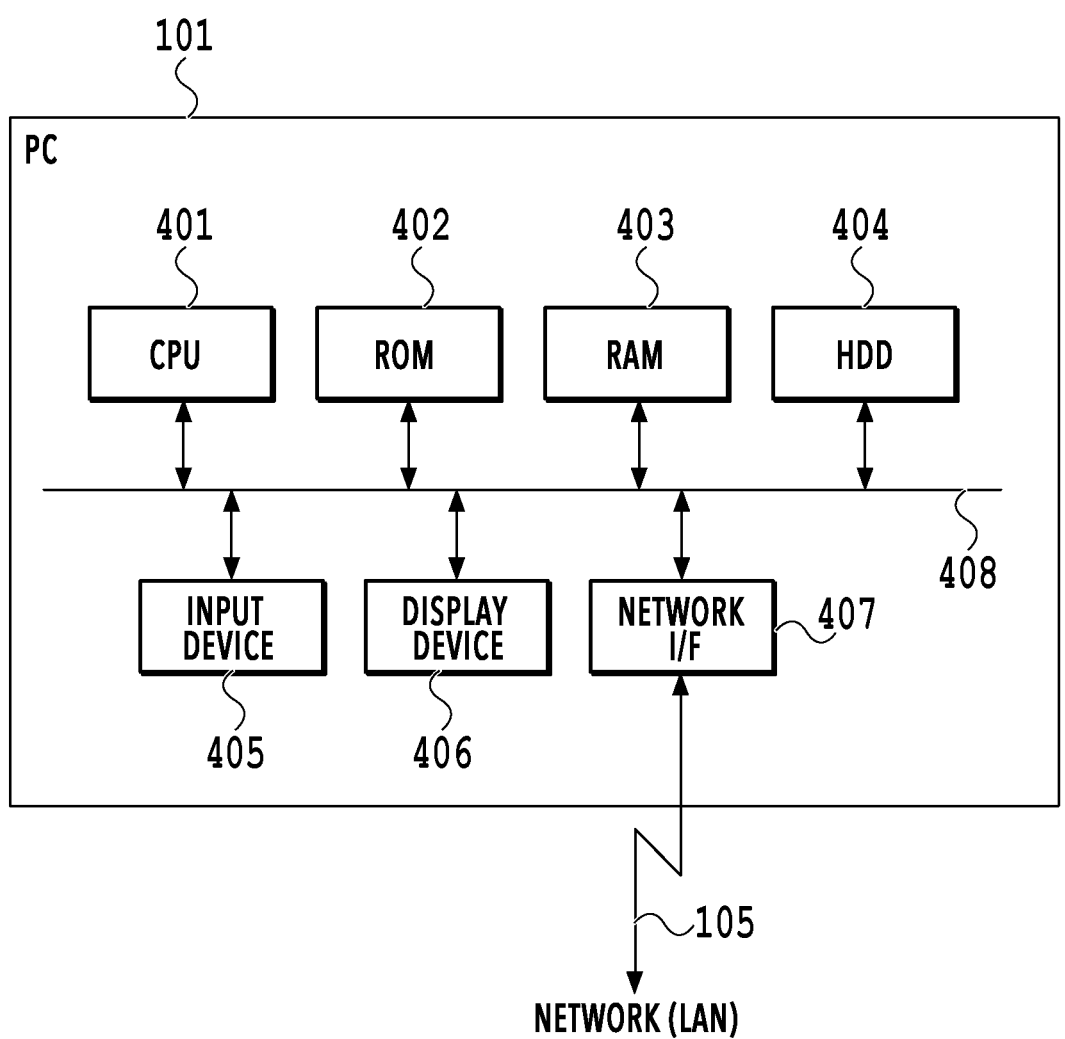
FIG. 4 is a block diagram showing a hardware configuration of a PC.

FIG. 4 is a block diagram showing the hardware configuration of the PC 101. The PC 101 includes a CPU1 401, a ROM 402, a RAM 403, a hard disk drive (HDD) 404, an input device 405, a display device 406, and a network I/F 407.

The CPU 401 is a computing device that controls the entire apparatus. The ROM 402 stores programs and data relating to each piece of processing. The RAM 403 is a volatile memory and used as a work memory for the CPU 401 to operate and as a storage memory for temporarily storing data relating to each piece of processing.

The HDD 404 stores programs relating to each piece of processing and various kinds of data, such as temporary data and application data. The input device 405 is, for example, a keyboard, a pointing device, and the like and receives an input of instructions to PC 101.

The display device 406 displays the operating state of the PC 101 and information that is output by each program running on the PC 101. The network I/F 407 is connected to the network 105 and inputs and outputs information to and from another PC or image forming apparatus connected on the network 105. The above blocks are arranged on a system bus 408.

By the CPU 401 performing processing based on the operation system (OS), the printer driver, and programs corresponding to the application software, which are stored in the HDD 404, the functions or processing by the OS and the printer driver is implemented.

Figure 5:
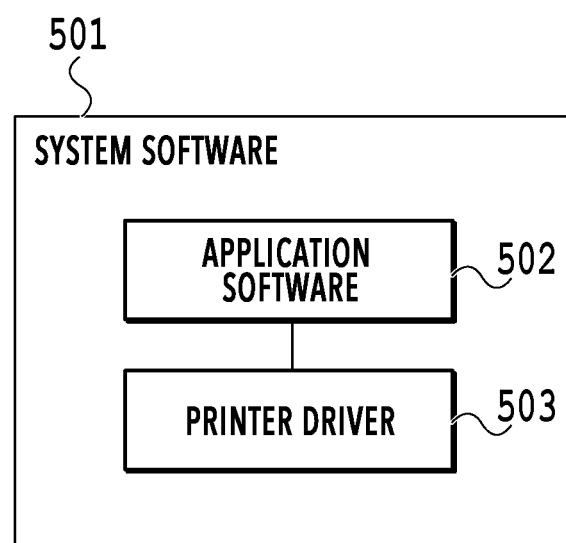
FIG. 5 is a block diagram showing a system software configuration of the PC.

FIG. 5 is a block diagram showing the system software configuration of the PC 101. System software 501 is stored in the storage unit, such as the ROM 402, the RAM 403, and the HDD 404, and executed by the CPU 401.

As shown in FIG. 5, the system software 501 includes application software 502 and a printer driver 503. The application software 502 is a tool (software) for a user to create and edit an image and a document by using the input device 405, such as a pointing device and a keyboard, while watching the display device 406 of the PC 101. A user creates various kinds of data, such as an image and a document, by using the application software 502 and further creates print command data by using the printer driver 503 and transmits the print command data to an apparatus capable of printing, such as the image forming apparatus 102.

Figure 6A:
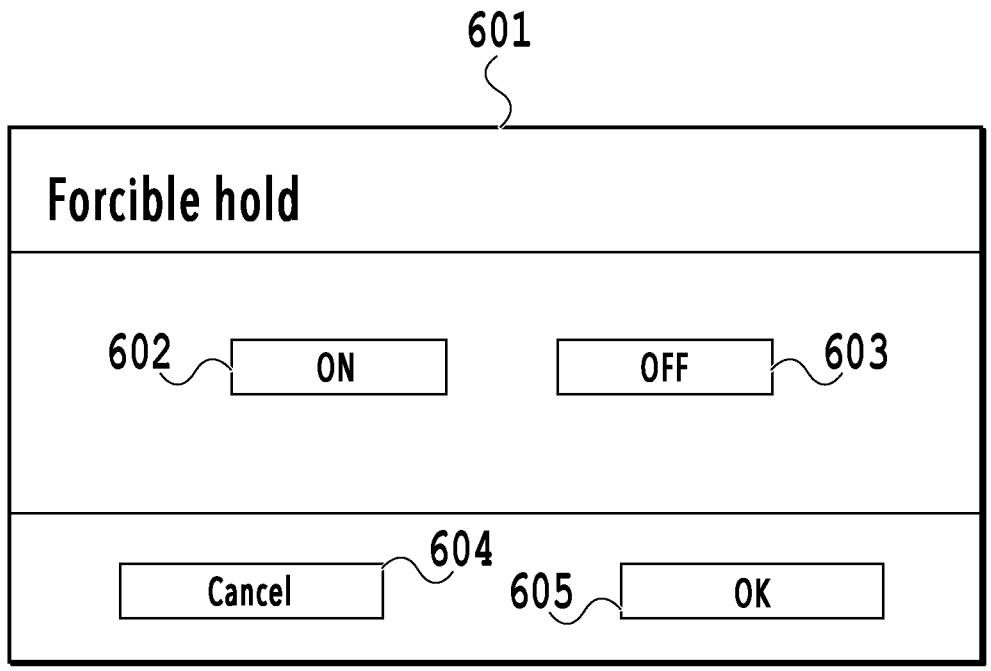
FIG. 6A is a diagram showing a setting screen of a forcible hold setting and FIG. 6B is a diagram showing a table that manages setting values.
Figure 6B:
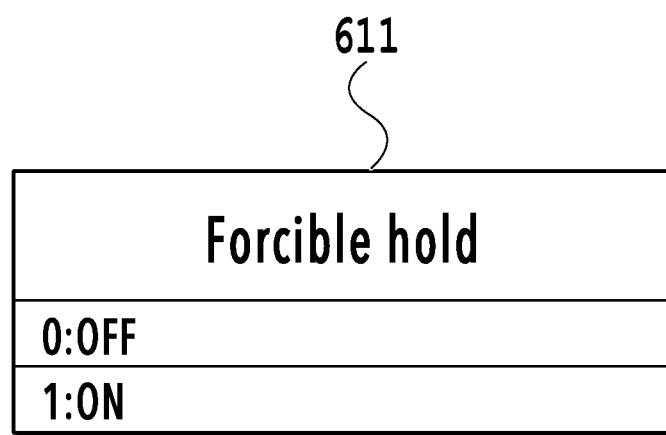

Based on the above configuration, next, by using FIG. 6A and FIG. 6B, a forcible hold setting (job hold setting) is explained. FIG. 6A is an example of a setting screen 601 on which to set forcible hold. The screen shown in FIG. 6A is a screen that can be displayed in a case where a user having the administrative right (hereinafter, referred to as administrator) has logged in and a screen that can be operated only by the administrator.

In FIG. 6A, in a case where ON 602 is set by the administrator, a print job input to the image forming apparatus 102 is stored forcibly in the HDD 205. As a supplement, in the present embodiment, to forcibly store an input print job in the HDD 205 and not to print the print job until a predetermined operation is performed is referred to as "to hold". In a case where a print job is performed in this state (that is, in the state where the print job is held), normally, a user selects the stored print job by operating the image forming apparatus 102 and gives instructions to perform printing.

Further, in FIG. 6A, in a case where OFF 603 is set by the administrator, a print job input to the image forming apparatus 102 is performed immediately. However, despite the setting of the OFF 603, a print job for which hold is set as the setting of the print job and a print job encrypted by a password are stored in the HDD 205 based on the setting of the print jobs.

In FIG. 6A, in a case where the administrator selects the ON 602 or the OFF 603 and presses down OK 605, the storage control unit 305 stores the setting value in the HDD 205. Further, in a case where the administrator presses down Cancel 604, the UI control unit 302 brings the setting screen shown in FIG. 6A into the nondisplay state. The setting value set by the administrator on the setting screen shown in FIG. 6A is managed in a table shown in FIG. 6B and held in the HDD 205. Further, it is possible for the job management unit 307 to refer to setting values 611 at arbitrary timing.

Next, by using FIG. 7A to FIG. 8B, a function to automatically print my job at the time of login (that is, post-authentication automatic printing function) is explained. Here, the time of login is the time at which a user is authenticated by user authentication and my job is a job of a user who has been authenticated.

Figure 7A:
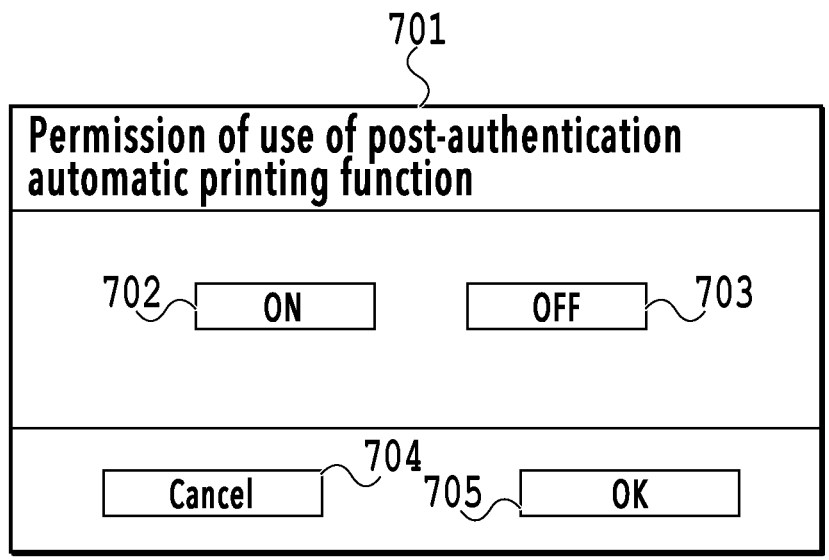
FIG. 7A is a diagram showing a setting screen on which to set permission of use of a post-authentication automatic printing function and FIG. 7B is a diagram showing a table that manages setting values.

FIG. 7A is an example of a setting screen 701 on which to set whether or not to permit the use of the post-authentication automatic printing function (that is, whether or not to permit execution of the automatic printing processing). The screen shown in FIG. 7A is a screen that can be displayed in a case where the administrator has logged in and only the administrator can change the setting on this screen.

Figure 8A:
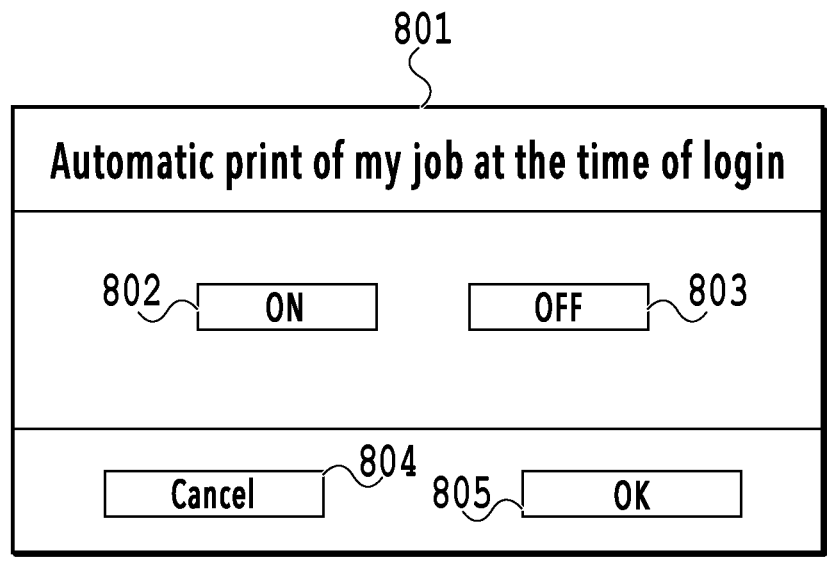
FIG. 8A is a diagram showing a setting screen on which to set whether or not to use the post-authentication automatic printing function and FIG. 8B is a diagram showing a table that manages setting values.
Figure 8B:
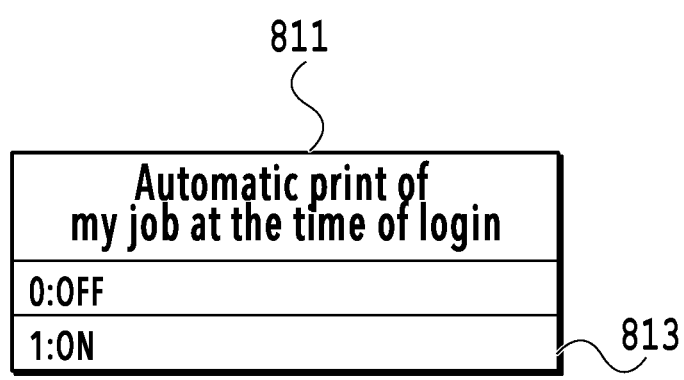

In FIG. 7A, in case where ON 702 is set by the administrator, the use of the post-authentication automatic printing function is permitted and it is made possible for a user to change the setting value shown in FIG. 8A, to be described later. Further, in FIG. 7A, in a case where OFF 703 is set by the administrator, the use of the post-authentication automatic printing function is not permitted, and therefore, it is no longer possible for a user to change the setting value shown in FIG. 8A, to be described later (for example, the setting value shown in FIG. 8A is grayed out and is no longer selectable). As described above, on the screen shown in FIG. 7A, it is possible for the administrator to set whether or not to permit the use of the post-authentication automatic printing function for a user.

In FIG. 7A, in a case where the administrator selects the ON 702 or the OFF 703 and presses down OK 705, the storage control unit 305 stores the setting value in the HDD 205. Further, in a case where the administrator presses down Cancel 704, the UI control unit 302 brings the setting screen shown in FIG. 7A into the nondisplay state. The setting value set by the administrator on the setting screen shown in FIG. 7A is managed in a table shown in FIG. 7B and held in the HDD 205. Further, it is possible for the job management unit 307 to refer to setting values 711 at arbitrary timing.

FIG. 8A is an example of a setting screen 801 on which to set whether or not to print my job automatically at the time of login. As described above, in the state where the post-authentication automatic printing function is permitted on the screen shown in FIG. 7A, it is possible for a user to set whether or not to automatically print an input print job by using the screen shown in FIG. 8A. Further, the screen in FIG. 8A is a screen that can be operated by a general user other than the administrator, different from the screen in FIG. 7A. That is, it is possible to set whether or not to use the post-authentication automatic printing function for each user.

In a case where ON 802 is set by a user, the image forming apparatus 102 automatically performs a print job of the user among the print jobs stored in the HDD 205 without printing instructions of the user based the user having logged in to the image forming apparatus 102. Further, in a case where OFF 803 is set by a user, even though the user has logged in to the image forming apparatus 102, the image forming apparatus 102 does not automatically print a print job of the user among the print jobs stored in the HDD 205. In this case, in order to perform the print job input by the user, it is necessary for the user to select the stored print job by operating the image forming apparatus 102 and give printing instructions.

In FIG. 8A, in a case where a user selects the ON 802 or the OFF 803 and presses down OK 805, the storage control unit 305 stores the setting value in the HDD 205. Further, in a case where a user presses down Cancel 804, the UI control unit 302 brings the setting screen shown in FIG. 8A into the nondisplay state. The setting value set by a user on the setting screen shown in FIG. 8A is managed in a table shown in FIG. 8B and held in the HDD 205. Further, it is possible for the job management unit 307 to refer to setting values 811 at arbitrary timing.

As described above, the configuration is such that whether or not to permit the use of the post-authentication automatic printing function is set by the administrator and whether or not to use the post-authentication automatic printing function actually can be set by a user. The reason the two-step control such as this is adopted is that even in a case where the image forming apparatus has a plurality of functions, how to use the functions is different for different users, and therefore, it is desirable to enable each user to select whether or not to use the post-authentication automatic printing function.

Next, by using FIG. 9, a storage sequence of a print job at the time of the setting of forcible hold and an automatic printing sequence after the authentication of a user of a print job are explained. Here, an example is explained in which a user transmits a print job to the image forming apparatus 102 by operating the PC 101 and the image forming apparatus 102 prints the print job.

The processing of the PC 101 is performed by the PC 101 by the CPU 401 of the PC 101 executing the system software 501, such as the application software 502 and the printer driver 503. Further, the processing of the image forming apparatus 102 is performed by the image forming apparatus 102 by the CPU 202 of the image forming apparatus 102 executing the system software 301.

In the following, first, the storage sequence of a print job at the time of the setting of forcible hold, that is, the processing at S901 to S906 is explained. It is assumed that symbol "S" in the explanation of the flowchart represents a step. This is also true with the explanation of subsequent flowcharts.

Further, here, a configuration is explained in which a normal print job (S901 to S903) for which no password is set and an encrypted secure print job (S904 to S906) for which a password is set are held, but the configuration is not necessarily limited to this. Consequently, for example, a configuration in which only a normal print job is or a configuration in which only an encrypted secure print job is held may be accepted.

At S901, a user gives instructions to print a normal print job for which no password is set by operating the PC 101. At S902, the PC 101 inputs a normal print job to the image forming apparatus 102. At S903, the image forming apparatus 102 holds the normal print job in the HDD 205. Due to this, the input of the normal print job to the image forming apparatus 102 is completed.

At S904, a user gives instructions to print an encrypted secure print job for which a password is set by operating the PC 101. At S905, the PC 101 inputs an encrypted secure print job to the image forming apparatus 102. At S906, the image forming apparatus 102 holds the encrypted secure print job in the HDD 205. Due to this, the input of the encrypted secure print job to the image forming apparatus 102 is completed.

A print job list at the point in time of completion of the processing at S901 to S906 is, for example, as in FIG. 10. On a print job list screen 1000 shown in FIG. 10, symbol 1001 and symbol 1002 indicate normal print jobs and symbol 1003 and symbol 1004 indicate encrypted secure print jobs.

Next, the automatic printing sequence after authentication, that is, the processing at S907 to S914 is explained. At S907, a user performs user authentication in the image forming apparatus 102 and logs in to the image forming apparatus 102. At S908, the image forming apparatus 102 automatically performs the normal print job that is held at S903 after user authentication. At this time, the encrypted secure print job that is held at S906 requires password collation, and therefore, the encrypted secure print job is not performed automatically (that is, not the target of automatic execution).

In a case where execution of the held normal print job is completed at S908, the image forming apparatus 102 advances the processing to S909. At S909, a user gives instructions to display a print job list by operating the image forming apparatus 102.

At S910, the image forming apparatus 102 displays a print job list screen shown in FIG. 11 on the operation unit 207. On a print job list screen 1100 shown in FIG. 11, encrypted secure print jobs 1101 and 1102 for which printing is not performed yet in the print job list on the print job list screen shown in FIG. 10 are displayed. In FIG. 11, the normal print jobs are not displayed in the list because the normal print jobs are performed (printing processing is performed), but it may also be possible to produce a display by which it is known that printing processing is performed.

At S911, a user selects an encrypted secure print job from the print job list screen by operating the image forming apparatus 102 and gives printing instructions. At S912, the image forming apparatus 102 displays a password input screen, not shown schematically, on the operation unit 207.

At S913, a user operates the operation unit 207 of the image forming apparatus 102 and inputs a password. At S914, the image forming apparatus 102 performs the encrypted secure print job. In a case of performing all the encrypted secure print jobs, the image forming apparatus 102 displays a print job list screen 1200 shown in FIG. 12 on the operation unit 207. Due to this, the sequence shown in FIG. 9 is completed.

Next, by using FIG. 13A, FIG. 13C, FIG. 13E, FIG. 13G, FIG. 13I, and FIG. 13K, settings relating to the post-authentication automatic printing function (that is, settings that need to limit the use of the post-authentication automatic printing function) of the settings relating to printing are illustrated. Each setting screen in FIG. 13A, FIG. 13C, FIG. 13E, FIG. 13G, FIG. 13I, and FIG. 13K is a screen that can be displayed in a case where the administrator has logged in and a screen that can be operated only by the administrator. In the following, the settings in FIG. 13A, FIG. 13C, FIG. 13E, FIG. 13G, FIG. 13I, and FIG. 13K are explained.

A setting screen 1301 in FIG. 13A is an example of a screen on which to set a setting to receive only an encrypted secure print job at the time of reception of a print job. Further, FIG. 13B is an example of a table that manages a setting value 1306 relating to the reception of only an encrypted secure print job.

On the setting screen 1301 in FIG. 13A, in a case where the administrator selects ON 1302 and presses down OK 1305, the storage control unit 305 changes the setting value 1306 to ON 1308 and stores in the HDD 205.

In a case where the setting value 1306 is set to the ON 1308, the image forming apparatus 102 operates so as not to receive a normal print job but receive only an encrypted secure print job of the print jobs. Here, the encrypted secure print job is a job that is not the target of post-authentication automatic printing as explained in the sequence in FIG. 9 described above, and therefore, in a case where the setting value 1306 is set to the ON 1308, the job that is the target of post-authentication automatic printing no longer exists.

Figure 7B:
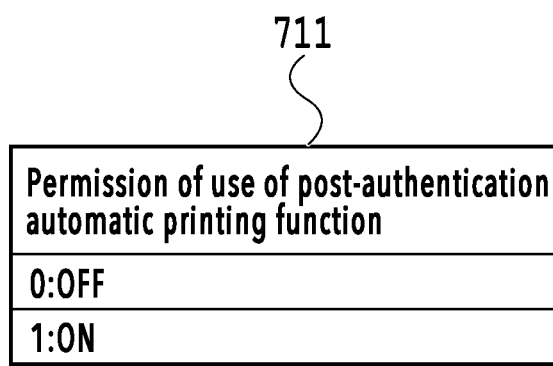

Consequently, in a case where the setting value 1306 is changed to the ON 1308 and stored in the HDD 205, the setting value 711 (that is, the setting value relating to the permission of the post-authentication automatic printing function) shown in FIG. 7B described above is changed to OFF 712 and stored in the HDD 205.

Further, in a case where the administrator selects OFF 1303 and presses down the OK 1305, the storage control unit 305 changes the setting value 1306 to OFF 1307 and stores in the HDD 205. In addition, in a case where the administrator presses down Cancel 1304, the UI control unit 302 brings the setting screen shown in FIG. 13A into the nondisplay state.

A setting screen 1311 in FIG. 13C is an example of a screen on which to set a setting to receive only a print job for which sharing is set in a department to which a user belongs at the time of reception of a print job. Further, FIG. 13D is an example of a table that manages a setting value 1316 relating to the reception of only a shared print job.

On the setting screen 1311 in FIG. 13C, in a case where the administrator selects ON 1312 and presses down OK 1315, the storage control unit 305 changes the setting value 1316 to ON 1318 and stores in the HDD 205.

In a case where the setting value 1316 is set to the ON 1318, the image forming apparatus 102 operates so as to receive only a print job for which sharing is set in a department to which a user belongs of the print jobs. Here, as explained in the sequence in FIG. 9 described above, the job that is the target of post-authentication automatic printing is a normal print job of a user who is authenticated and the print job for which sharing is set in a department to which a user belongs is the job that is not the target of post-authentication automatic printing. Because of this, in a case where the setting value 1316 is set to the ON 1312, the job that is that target of post-authentication automatic printing no longer exists.

Consequently, in a case where the setting value 1316 is changed to the ON 1318 and stored in the HDD 205, the setting value 711 (that is, the setting value relating to the permission of the post-authentication automatic printing function) shown in FIG. 7B described above is changed to the OFF 712 and stored in the HDD 205.

Further, in a case where the administrator selects OFF 1313 and presses down the OK 1315, the storage control unit 305 changes the setting value 1316 to OFF 1317 and stores in the HDD 205. In addition, in a case where the administrator presses down Cancel 1314, the UI control unit 302 brings the setting screen shown in FIG. 13C into the nondisplay state.

A setting screen 1321 in FIG. 13E is an example of a screen on which to set whether or not it is possible to use a personal setting that can be set for each user. Further, FIG. 13F is an example of a table that manages a setting value 1326 relating to whether or not it is possible to use a personal setting.

On the setting screen 1321 in FIG. 13E, in a case where the administrator selects ON 1322 and presses down OK 1325, the storage control unit 305 changes the setting value 1326 to ON 1328 and stores in the HDD 205. Further, in a case where the administrator selects OFF 1323 and presses down the OK 1325, the storage control unit 305 changes the setting value 1326 to OFF 1327 and stores in the HDD 205.

Here, in a case where the setting value 1326 is set to the ON 1322, the image forming apparatus 102 operates so that the personal setting can be changed for each user, but in a case where the setting value 1326 is set to the OFF 1323, the image forming apparatus 102 operates so that the personal setting cannot be changed for each user. That is, in a case where the setting value 1326 is set to the OFF 1323, the personal setting becomes invalid.

In relation to this, the setting of whether or not to perform the post-authentication automatic printing in FIG. 8A described above can be set by each user (that is, personal setting) and in a case where the setting is such that the personal setting cannot be used for each user, it is no longer possible to set whether or not to perform the post-authentication automatic printing.

Consequently, in a case where the setting value 1326 is changed to the OFF 1327 and stored in the HDD 205, the setting value 711 (that is, the setting value relating to the permission of the post-authentication automatic printing function) shown in FIG. 7B described above is changed to the OFF 712 and stored in the HDD 205. In addition, in a case where the administrator presses down Cancel 1324, the UI control unit 302 brings the setting screen shown in FIG. 13E into the nondisplay state.

A setting screen 1331 in FIG. 13G is an example of a screen on which to set whether or not to perform charging processing for a print job at the time of printing. Further, FIG. 13H is an example of a table that manages a setting value 1336 relating to whether or not to perform charging processing for a print job.

On the setting screen 1331 in FIG. 13G, in a case where the administrator selects ON 1332 and presses down OK 1335, the storage control unit 305 changes the setting value 1336 to ON 1338 and stores in the HDD 205.

In a case where the setting value 1336 is set to the ON 1338, the image forming apparatus 102 operates so as to perform charging processing for a print job at the time of printing. Here, it is desirable for the charging processing to be processed for each print job because it becomes necessary to check the money amount in a case where there is an upper limit to the money amount, and for the operation of the post-authentication automatic printing accompanied by the charging processing to be difficult and limited because the processing involves the fund of a user.

Consequently, in a case where the setting value 1336 is changed to the ON 1338 and stored in the HDD 205, the setting value 711 (that is, the setting value relating to the permission of the post-authentication automatic printing function) shown in FIG. 7B described above is changed to the OFF 712 and stored in the HDD 205.

Further, in a case where the administrator selects OFF 1333 and presses down the OK 1335, the storage control unit 305 changes the setting value 1336 to OFF 1337 and stores in the HDD 205. In addition, in a case where the administrator presses down Cancel 1334, the UI control unit 302 brings the setting screen shown in FIG. 13G into the nondisplay state.

Figure 13I:
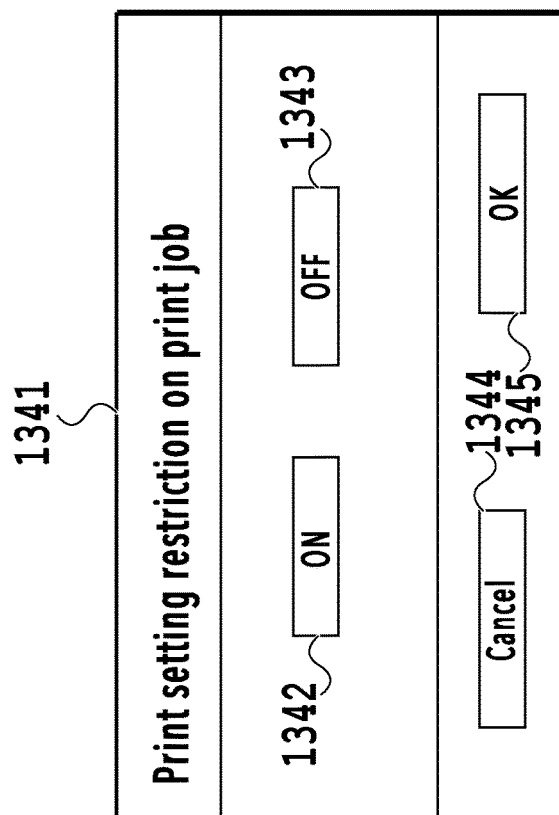
Figure 13J:
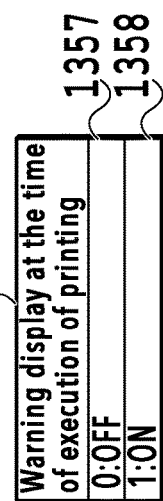

A setting screen 1341 in FIG. 13I is an example of a screen on which to set whether or not to impose a print setting restriction on a print job. Further, FIG. 13J is an example of a table that manages a setting value 1346 relating to whether or not to impose the print setting restriction on a print job.

On the setting screen 1341 in FIG. 13I, in a case where the administrator selects ON 1342 and presses down OK 1345, the storage control unit 305 changes the setting value 1346 to ON 1348 and stores in the HDD 205.

In a case where the setting value 1346 is set to the ON 1348, the image forming apparatus 102 operates so as to impose the print setting restriction on a printing-target print job based on the print setting restriction information that is set.

Here, the print setting restriction is, for example, a restriction to prohibit color printing (that is, only monochrome printing is permitted), a restriction to prohibit single-side printing (that is, only double-side printing is permitted), or the like and it is possible to set one or more print setting restrictions in the image forming apparatus 102. In a case where an attempt is made to perform a print job corresponding to a set print setting restriction, the image forming apparatus 102 displays an error screen on the operation unit 207 and causes a user to select to change the print setting or cancel the print job.

In the operation of the post-authentication automatic printing accompanied by the setting of a print setting restriction, in a case where a plurality of print jobs corresponds to the condition of the print setting restriction, it is necessary to change the setting in order for all the print jobs to be automatically performed or cancel the print jobs. That is, there is a possibility that the operation becomes complicated. Because of this, it is desirable not to perform the operation of the post-authentication automatic printing accompanied by the setting of a print setting restriction.

Consequently, in a case where the setting value 1346 is changed to the ON 1348 and stored in the HDD 205, the setting value 711 (that is, the setting value relating to the permission of the post-authentication automatic printing function) shown in FIG. 7B described above is changed to the OFF 712 and stored in the HDD 205.

Further, in a case where the administrator selects OFF 1343 and presses down the OK 1345, the storage control unit 305 changes the setting value 1346 to OFF 1347 and stores in the HDD 205. In addition, in a case where the administrator presses down Cancel 1344, the UI control unit 302 brings the setting screen shown in FIG. 13I into the nondisplay state.

Figure 13K:
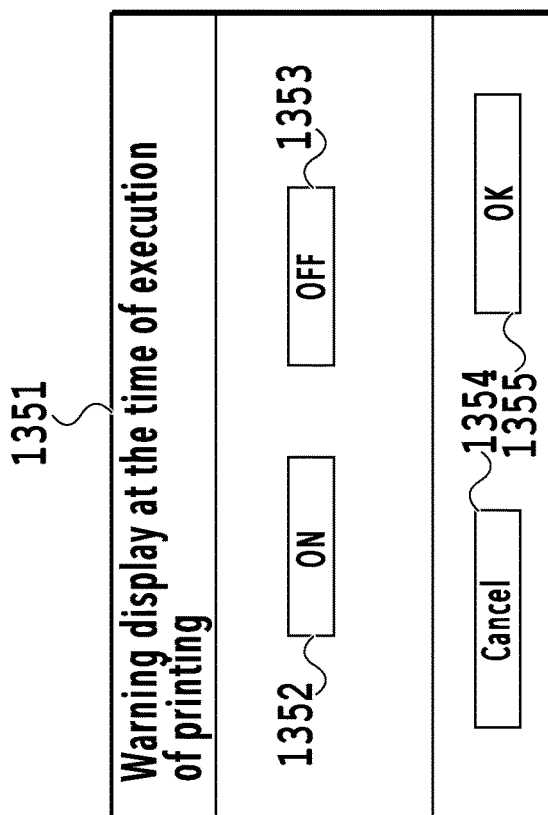
Figure 13L:
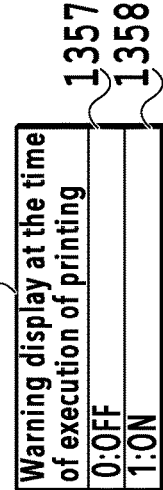

A setting screen 1351 in FIG. 13K is an example of a screen on which to set whether or not to display a warning at the time of execution of a print job. Further, FIG. 13L is an example of a table that manages a setting value 1356 relating to whether or not to display a warning at the time of execution of a print job.

On the setting screen in FIG. 13K, in a case where the administrator selects ON 1352 and presses down OK 1355, the storage control unit 305 changes the setting value 1356 to ON 1358 and stores in the HDD 205.

In a case where the setting value 1356 is set to the ON 1358, the image forming apparatus 102 operates so as to display a warning at the time of execution of a printing-target print job based on a warning condition that is set.

Here, the warning condition is, for example, a warning display at the time of color printing, a warning display at the time of single-side printing, a warning display at the time of printing of a large number of pages (for example, 100 pages or more), or the like and it is possible to set one or more warning conditions in the image forming apparatus 102. In a case where an attempt is made to perform a print job corresponding to a set warning condition, the image forming apparatus 102 displays a warning screen on the operation unit 207 and causes a user to select to change the print setting or cancel the print job.

In the operation of the post-authentication automatic printing accompanied by the setting of a warning condition, in a case where a plurality of print jobs corresponds to the warning condition, it is necessary to select to change the setting in order for all the print jobs to be automatically performed, perform printing without changing the print setting, or cancel the print job. That is, there is a possibility that the operation becomes complicated. Because of this, it is desirable not to perform the operation of the post-authentication automatic printing accompanied by the setting of a warning condition.

Consequently, in a case where the setting value 1356 is changed to the ON 1358 and stored in the HDD 205, the setting value 711 (that is, the setting value relating to the permission of the post-authentication automatic printing function) shown in FIG. 7B described above is changed to the OFF 712 and stored in the HDD 205.

Further, in a case where the administrator selects OFF 1353 and presses down the OK 1355, the storage control unit 305 changes the setting value 1356 to OFF 1357 and stores in the HDD 205. In addition, in a case where the administrator presses down Cancel 1354, the UI control unit 302 brings the setting screen shown in FIG. 13K into the nondisplay state.

As explained above, in a case where the setting value is changed as described above on the setting screen in each of FIG. 13A, FIG. 13C, FIG. 13E, FIG. 13G, FIG. 13I, and FIG. 13K, the setting value relating to the permission of the post-authentication automatic printing function shown in FIG. 7B is changed to the OFF 712.

Further, in this case, the setting screen 701 on which to set whether or not to permit the use of the post-authentication automatic printing function in FIG. 7A is controlled so that the setting screen cannot be operated, for example, such as that the OK button or the OK button 702 cannot be pressed down and that the setting screen 701 is brought into the nondisplay state.

Figure 14:
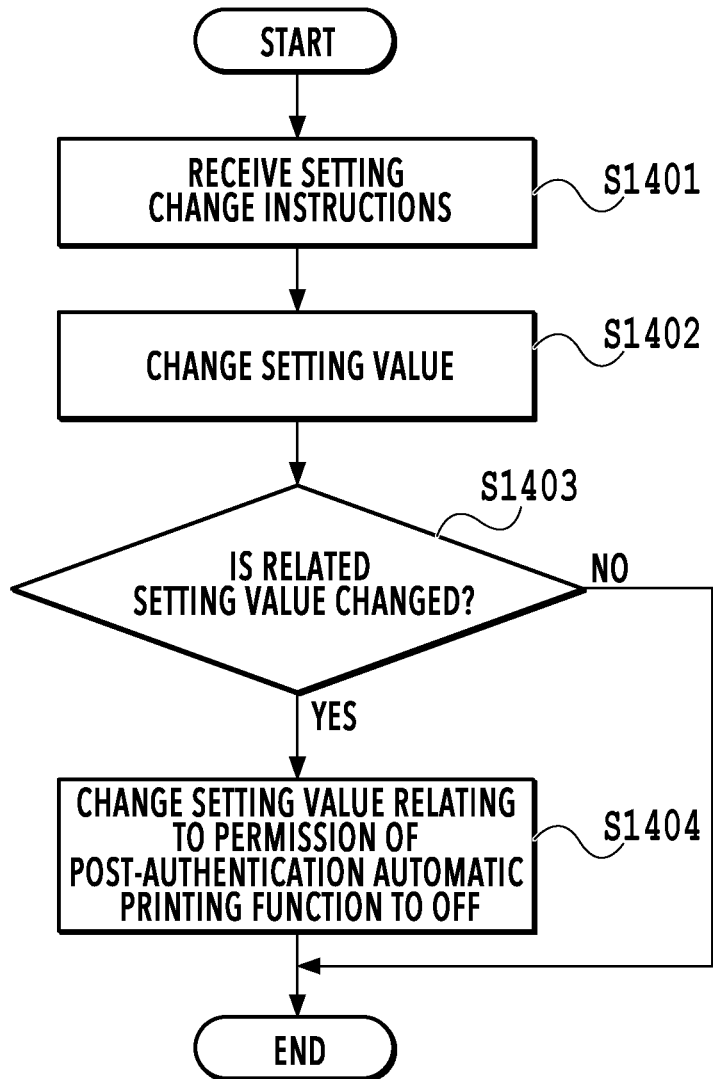
FIG. 14 is a flowchart showing a procedure of setting value change processing in the image forming apparatus.

Next, by using the flowchart in FIG. 14, the procedure of setting value change processing of the image forming apparatus 102 is explained. The processing of the image forming apparatus 102 shown in FIG. 14 is performed by the image forming apparatus 102 by the CPU 202 of the image forming apparatus 102 executing the system software 301.

At S1401, the UI control unit 302 receives setting change instructions from the administrator via the operation unit I/F 206 and transmits the setting change instructions to the data management unit 304. At S1402, the data management unit 304 changes the setting value stored in the HDD 205 based on the setting change instructions received from the UI control unit 302. This setting value change processing is processing to change at least one of the setting value 1306 in FIG. 13B, the setting value 1316 in FIG. 13D, the setting value 1326 in FIG. 13F, the setting value 1336 in FIG. 13H, the setting value 1346 in FIG. 13J, and the setting value 1356 in FIG. 13L.

At S1403, the data management unit 304 determines whether or not the setting value changed at S1402 is the setting value that is the target for which the setting value 711 (that is, the setting value relating to the permission of the post-authentication automatic printing function) is changed to the OFF 712. Specifically, the data management unit 304 determines that the setting value changed at S1402 is the setting value that is the target for which the setting value 711 is changed to the OFF 712 in a case where the setting value changed at S1402 is the following setting value.

(1) In a case where the setting value 1306 of the setting to receive only an encrypted secure print job in FIG. 13B is changed to the ON 1308

(2) In a case where the setting value 1316 of the setting to receive only a print job for which sharing is set in a department to which a user belongs in FIG. 13D is changed to the ON 1318

(3) In a case where the setting value 1326 to set whether or not it is possible to use the personal setting that can be set for each user in FIG. 13F is changed to the OFF 1327

(4) In a case where the setting value 1336 to set whether or not to perform charging processing for a print job in FIG. 13H is changed to the ON 1338

(5) In a case where the setting value 1346 to set whether or not to impose a print setting restriction on a print job in FIG. 13J is changed to the ON 1348

(6) In a case where the setting value 1356 to set whether or not to display a warning at the time of execution of a print job in FIG. 13L is changed to the ON 1358

In a case of determining that the setting value changed at S1402 is the setting value that is the target for which the setting value 711 is changed to the OFF 712 (Yes at S1403) at S1403, the data management unit 304 advances the processing to S1404. Further, in a case of determining that the setting value changed at S1402 is not the setting value that is the target for which the setting value 711 is changed to the OFF 712 (No at S1403), the data management unit 304 terminates the setting value change processing shown in FIG. 14. At S1404, the data management unit 304 changes the setting value relating to the permission of the post-authentication automatic printing function shown in FIG. 7B described above (that is, the setting value 711) to the OFF 712 and the terminates the setting value change processing shown in FIG. 14.

As to the processing at S1404, it is also possible to change the setting value relating to the permission of the post-authentication automatic printing function shown in FIG. 7B described above (that is, the setting value 711) to the OFF 712 based on the setting change instructions from the administrator at S1401.

Figure 15:
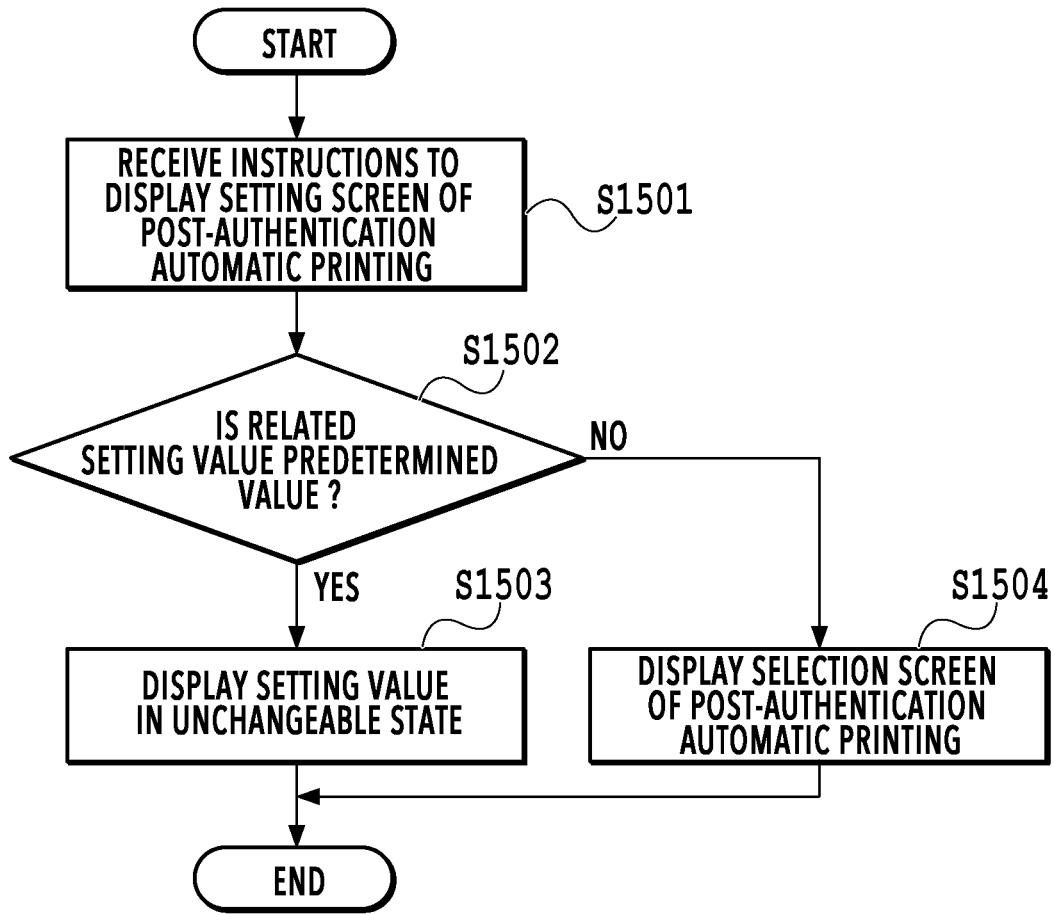
FIG. 15 is a flowchart showing a procedure of setting screen display processing of post-authentication automatic printing in the image forming apparatus.

Next, by using the flowchart in FIG. 15, the procedure of setting screen display processing of the post-authentication automatic printing of the image forming apparatus 102 is explained. The processing of the image forming apparatus 102 shown in FIG. 15 is performed by the image forming apparatus 102 by the CPU 202 of the image forming apparatus 102 executing the system software 301.

At S1501, the UI control unit 302 receives instructions to display the setting screen of the post-authentication automatic printing from the administrator via the operation unit I/F 206 and transmits the display instructions to the data management unit 304.

At S1502, the data management unit 304 determines whether or not one of the setting values explained in FIG FIG. 13B, FIG. 13D, FIG. 13F, FIG. 13H, FIG. 13J, and FIG. 13L described above is the setting value for which the setting value 711 (that is, the setting value relating to the permission of the post-authentication automatic printing function) is changed to the OFF 712. In a case of determining that the setting value changed at S1402 is the setting value that is the target for which the setting value 711 is changed to the OFF 712 (Yes at S1502) at S1502, the data management unit 304 advances the processing to S1503. Further, in a case of determining that the setting value changed at S1402 is not the setting value that is the target for which the setting value 711 changed to the OFF 712 (No at S1502), the data management unit 304 advances the processing to S1504.

At S1503, the data management unit 304 transmits the setting screen of the post-authentication automatic printing, which is controlled so that the setting value cannot be changed, to the UI control unit 302 and the UI control unit 302 causes the operation unit 207 to display the setting screen of the post-authentication automatic printing transmitted from the data management unit 304.

Figure 16A:
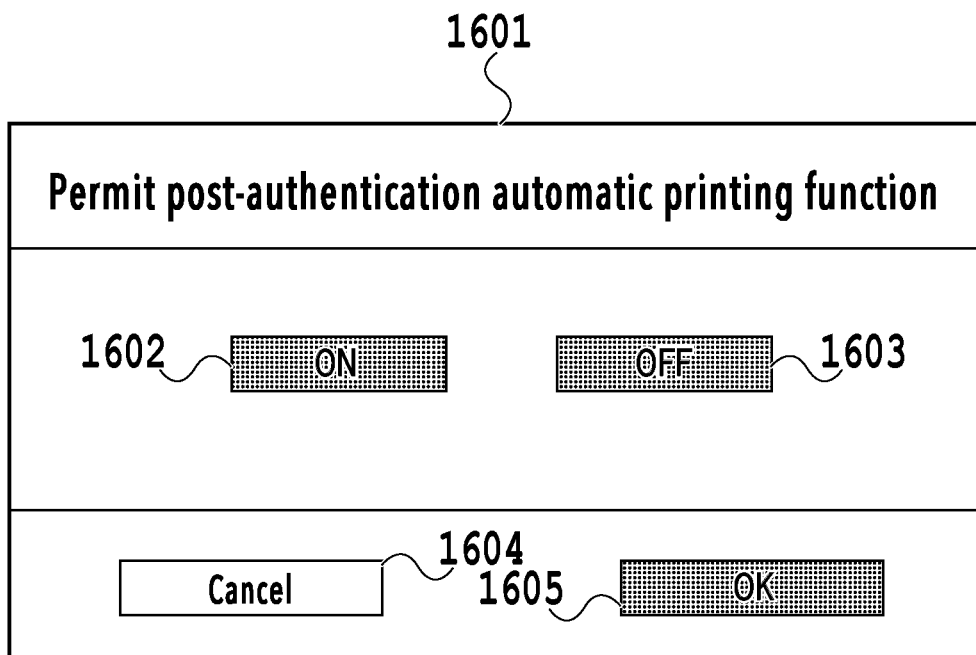
FIG. 16A and FIG. 16B are each a diagram showing a setting screen on which the use of the post-authentication automatic printing function is limited.
Figure 16B:
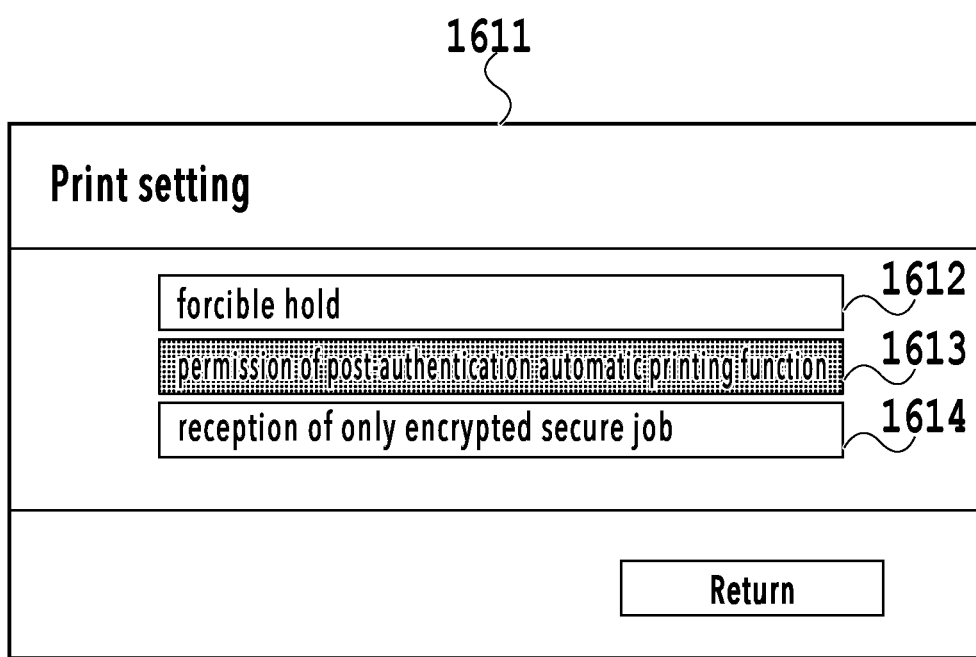

Here, by using FIG. 16A and FIG. 16B, the setting screen of the post-authentication automatic printing, which is controlled so that the setting value cannot be changed, is illustrated. In the example shown in FIG. 16A, a setting screen 1601 is displayed and the setting screen 1601 is controlled so that the setting value of the post-authentication automatic printing cannot be changed by graying out the displays of ON 1602, OFF 1603, and OK 1605.

Further, in the example shown in FIG. 16B, the setting screen itself of the post-authentication automatic printing is not displayed. In the example shown in FIG. 16B, on a Print setting screen 1611, it is possible for the administrator to select a menu 1612 of forcible hold and a menu 1614 of reception of only encrypted secure print job. However, a menu 1613 of permission of post-authentication automatic printing function is grayed out so that the menu 1613 cannot be selected.

At S1504, the data management unit 304 transmits the setting screen 701 shown in FIG. 7A (that is, the setting screen on which to set whether or not to permit the use of the post-authentication automatic printing function) to the UI control unit 302 and causes the operation unit 207 to display the setting screen 701. In a case where the processing at S1503 or the processing at S1504 is performed, the image forming apparatus 102 terminates the setting screen display processing of the post-authentication automatic printing.

Figure 17:
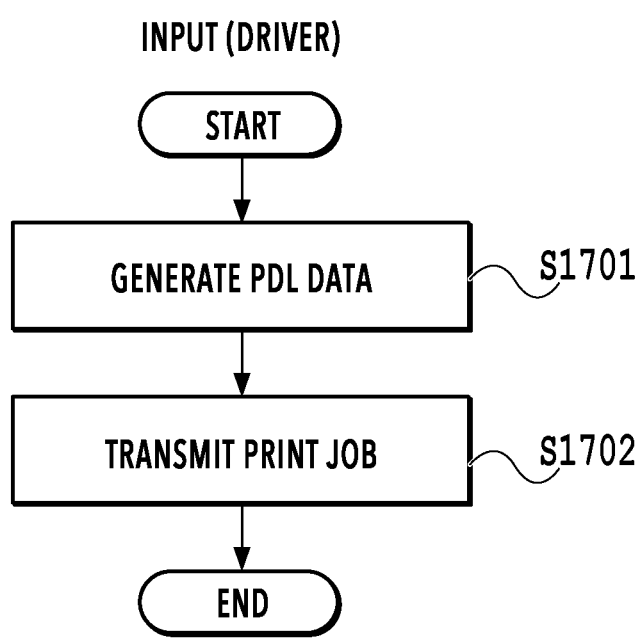
FIG. 17 is a flowchart showing a procedure of input processing of a print job in the PC.

Next, by using the flowchart in FIG. 17, the procedure of print job input processing in the PC 101 is explained. The processing of the PC 101 shown in FIG. 17 is performed by the PC 101 by the CPU 401 of the PC 101 executing the system software 501, such as the application software 502 and the print driver 503. The processing shown in FIG. 17 is started by a user creating data, such as an image and a document, by the application software 502 and giving printing instructions by using the input device 405, such as a pointing device and a keyboard.

At S1701, the print driver 503 creates PDL data in accordance with the data of an image, a document, and the like, the document attribute, such as a document name, and the print setting information that is set in the print driver 503 at the time of printing instructions. In a case where an encrypted secure print job is created at the time of creation of PDL data, the password included in the print setting information is attached to the PDL data. At S1702, the PC 102 transmits the PDL data as a print job to the image forming apparatus 102.

Figure 18:
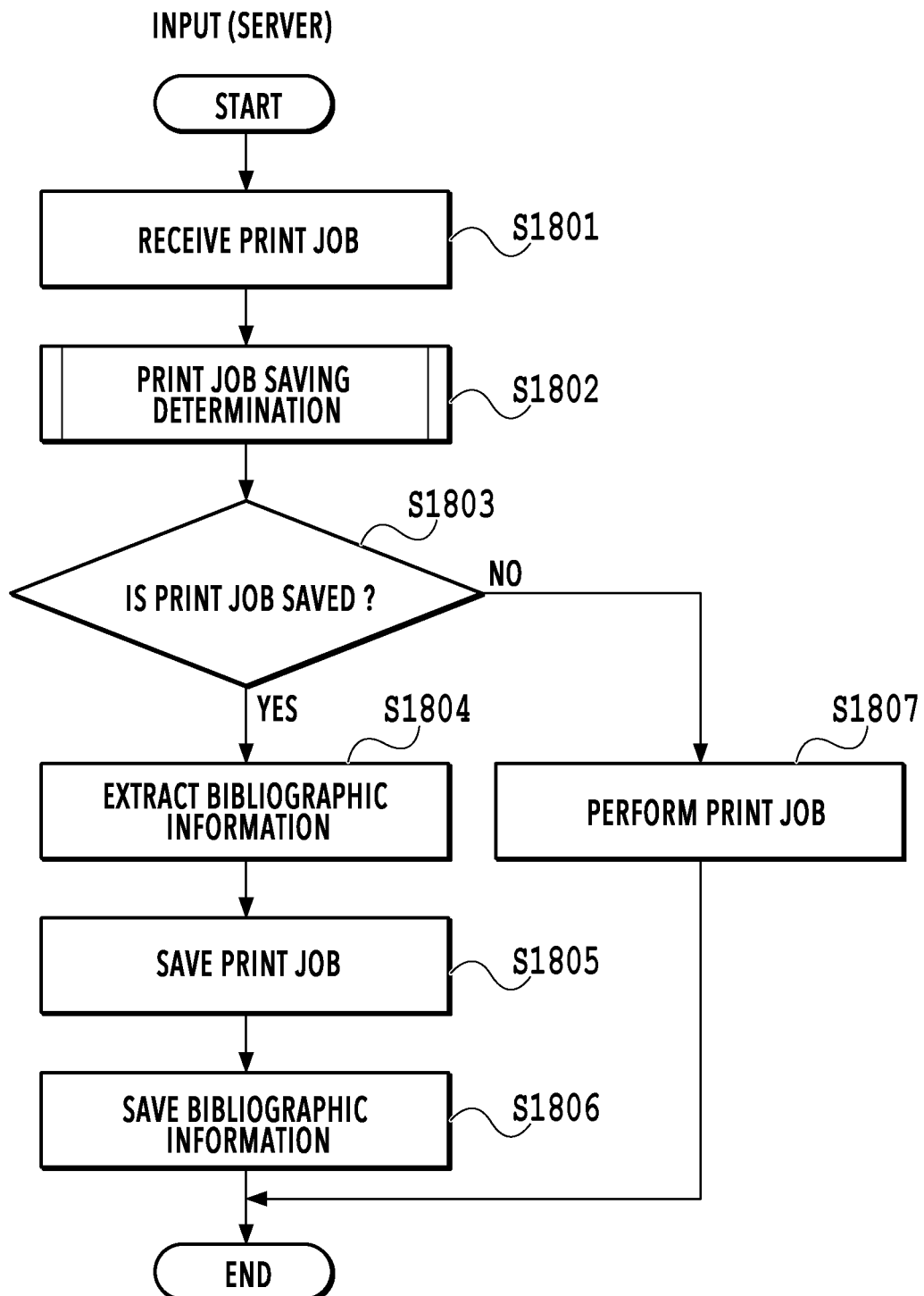
FIG. 18 is a flowchart showing a procedure of input processing of a print job and saving processing of a print job in the image forming apparatus.

Next, by using the flowchart in FIG. 18, the procedure of print job input processing and print job saving processing in the image forming apparatus 102 is explained. The processing of the image forming apparatus 102 shown in FIG. 18 is performed by the image forming apparatus 102 by the CPU 202 of the image forming apparatus 102 executing the system software 301.

Further, the processing shown in FIG. 18 is started by the PC 101 transmitting a print job at S1702 in FIG. 17. In a case where the print job transmitted at S1702 is input to the image forming apparatus 102 via the server, at S1801, the network control unit 306 receives the print job from the PC 101. The received print job is transmitted to the job management unit 307.

Figure 19:
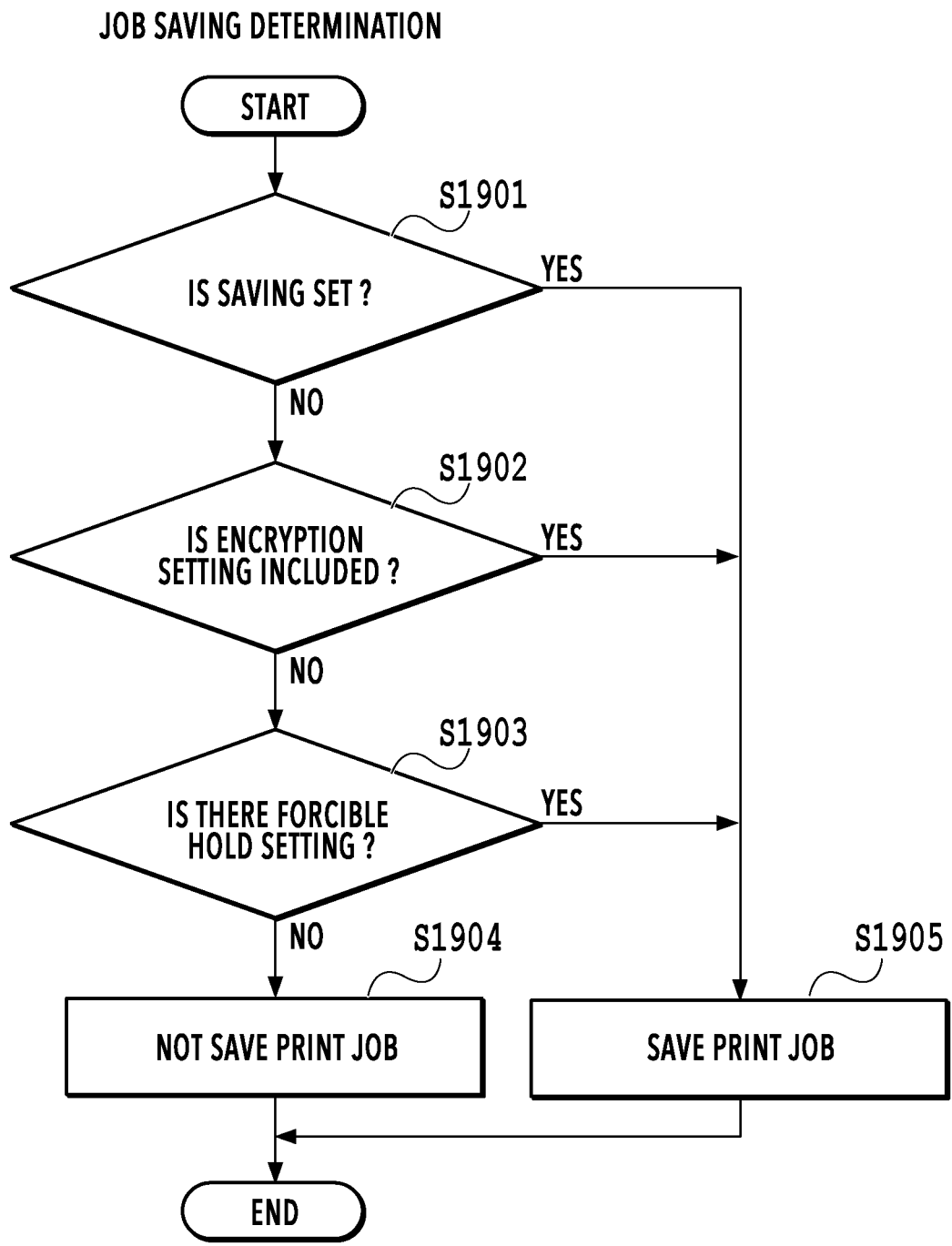
FIG. 19 is a flowchart showing a procedure of saving determination processing of a print job in the image forming apparatus.

At S1802, upon receipt of the print job, the job management unit 307 determines whether or not to save the print job. Here, print job saving determination processing at S1802 is explained supplementally by using FIG. 19. The processing of the image forming apparatus 102 shown in FIG. 19 is performed by the image forming apparatus 102 by the CPU 202 of the image forming apparatus 102 executing the system software 301.

At S1901, the job management unit 307 interprets the print job and determines whether or not saving is set. In a case where saving is set (Yes at S1901), the job management unit 307 advances the processing to S1905 and in a case where saving is not set (No at S1901), the job management unit 307 advances the processing to S1902.

At S1902, the job management unit 307 interprets the print job and determines whether or not an encryption setting is included in the print setting. In a case where the encryption setting is included (Yes at S1902), the job management unit 307 advances the processing to S1905 and in a case where the encryption setting is not included (No at S1902), the job management unit 307 advances the processing to S1903.

At S1903, the job management unit 307 acquires the forcible hold setting value 711 and determines whether or not forcible hold is set based on the acquired forcible hold setting value 711. In a case where forcible hold is set (Yes at S1903), the job management unit 307 advances the processing to S1905 and in a case where forcible hold is not set (No at S1903), the job management unit 307 advances the processing to S1904.

At S1904, the job management unit 307 determines not to save the print job. Further, at S1905, the job management unit 307 determines to save the print job. In a case where the processing at S1904 or the processing at S1905 is performed, the saving determination processing shown in FIG. 19 (that is, the print job saving determination processing at S1802) is terminated.

Explanation is returned to FIG. 18 again, at S1803, the job management unit 307 branches the subsequent processing based on the determination results at S1802. Specifically, in a case of saving the print job (Yes at S1803), the job management unit 307 advances the processing to S1804 and in a case of not saving the print job (No at S1803), the job management unit 307 advances the processing to S1807.

At S1804, the job management unit 307 transmits the print job to the data management unit 304. The data management unit 304 analyzes the print job received from the job management unit 307 and extracts bibliographic information.

Here, by using FIG. 20, the bibliographic information is supplemented. FIG. 20 is a diagram showing the bibliographic information as a list. In a bibliographic information list 2001 shown in FIG. 20, symbol 2009 to symbol 2016 each indicate bibliographic information on each print job. Further, the bibliographic information includes, as items, Date 2002 of input of the print job, name (User name) 2003 of a user who has input the print job, Storage location 2004 of the print job, Print job name 2005, Print setting 2006, Print job type 2007, and Password 2008. In a case where the normal print job and the encrypted secure print job are managed as bibliographic information different from each other, it is not necessary to manage Print job type 2007 in the bibliographic information shown in FIG. 20.

Explanation is returned to FIG. 18 again, at S1805, the data management unit 304 transmits the print job and the extracted bibliographic information to the storage control unit 305. The storage control unit 305 saves the print job received from the data management unit 304 in the HDD 205. Further, at S1806, the storage control unit 305 saves the bibliographic information extracted at S1804 in the HDD 205. In FIG. 18, the processing at S1806 is shown as the procedure that is performed after the processing at S1805 is performed, but it may also be possible to perform the processing at S1806 at the same time as the processing at S1805.

Further, at S1807, the job management unit 307 requests the job control unit 308 to perform the print job and the printer 211 performs printing based on the print job. In a case where the processing at S1806 or the processing at S1807 is performed, the print job input processing and the print job saving processing shown in FIG. 18 are terminated.

Figure 21:
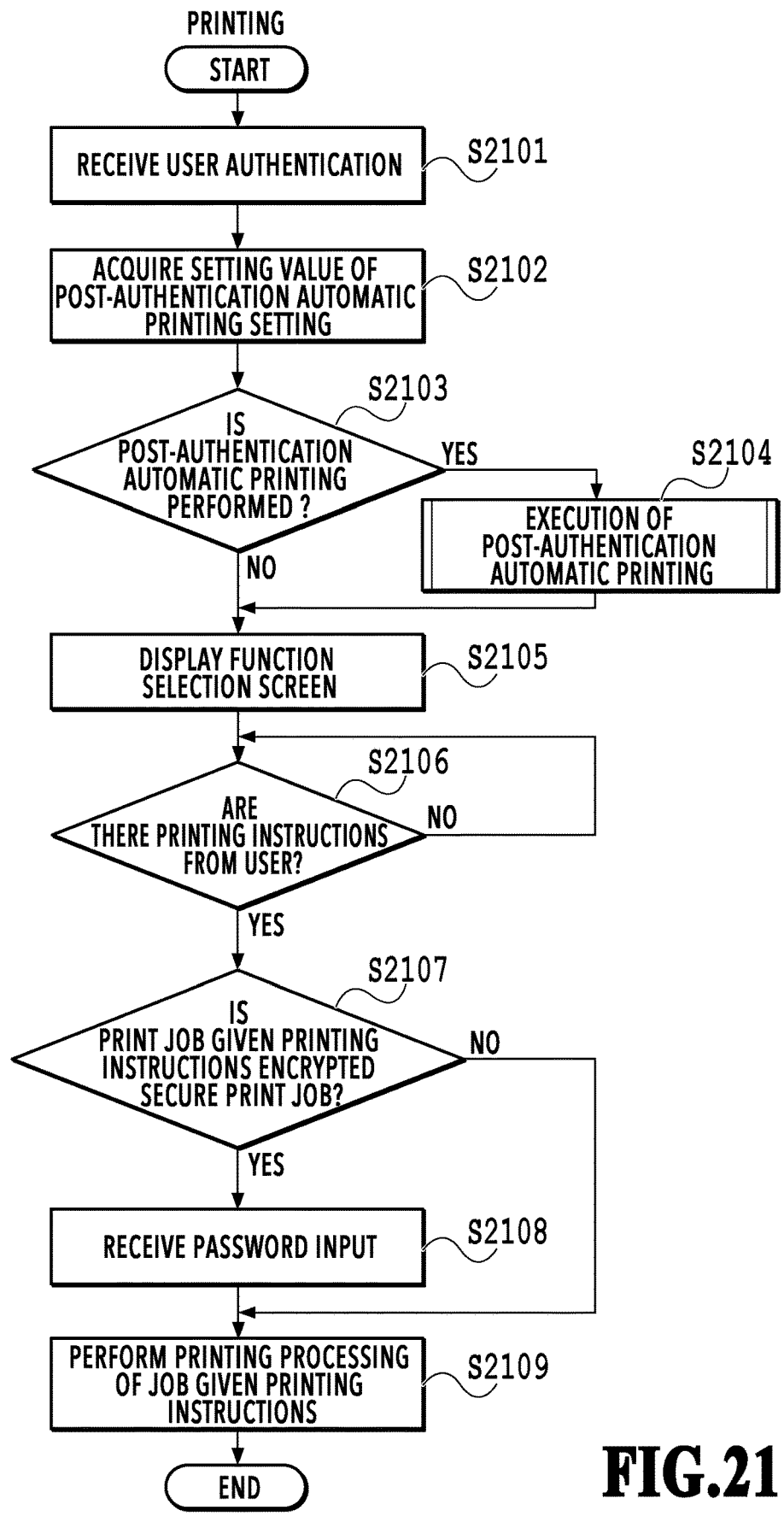
FIG. 21 is a flowchart showing a procedure of printing processing in the image forming apparatus.

Next, by using the flowchart in FIG. 21, the procedure of the printing processing in the image forming apparatus 102 is explained. The printing processing here corresponds to the processing at S907 to S914 in FIG. 9 described above. The processing of the image forming apparatus 102 shown in FIG. 21 is performed by the image forming apparatus 102 by the CPU 202 of the image forming apparatus 102 executing the system software 301.

At S2101, the image forming apparatus 102 receives user authentication from a user. As the user authentication method, for example, there is a method of receiving authentication instructions from a user by displaying a screen on which to input an ID (user name) and a password on the operation unit 207. Further, for example, there is also a method of performing authentication by causing the image forming apparatus 102 to read an ID card or the like, in which an ID and a password are stored. Then, in a case where the user authentication has succeeded, the image forming apparatus 102 advances the processing to S2102.

At S2102, the job management unit 307 acquires the setting value 711 relating to the permission of the post-authentication automatic printing function by the administrator and the setting value 811 relating to the use of the post-authentication automatic printing function by a user.

At S2103, the job management unit 307 determines whether or not to perform the post-authentication automatic printing based on the setting value 711 relating to the permission of the post-authentication automatic printing function by the administrator and the setting value 811 relating to the use of the post-authentication automatic printing function by a user. In a case of determining to perform the post-authentication automatic printing (Yes at S2103), the job management unit 307 advances the processing to S2104 and in a case of determining not to perform the post-authentication automatic printing (No at S2103), the job management unit 307 advances the processing to S2105.

In a case where the setting value 711 relating to the permission of the post-authentication automatic printing function is ON 713 and the setting value 811 relating to the use of the post-authentication automatic printing function is ON 813, the job management unit 307 determines to perform the post-authentication automatic printing. Further, in the other cases, the job management unit 307 determines not to perform the post-authentication automatic printing.

Figure 22:
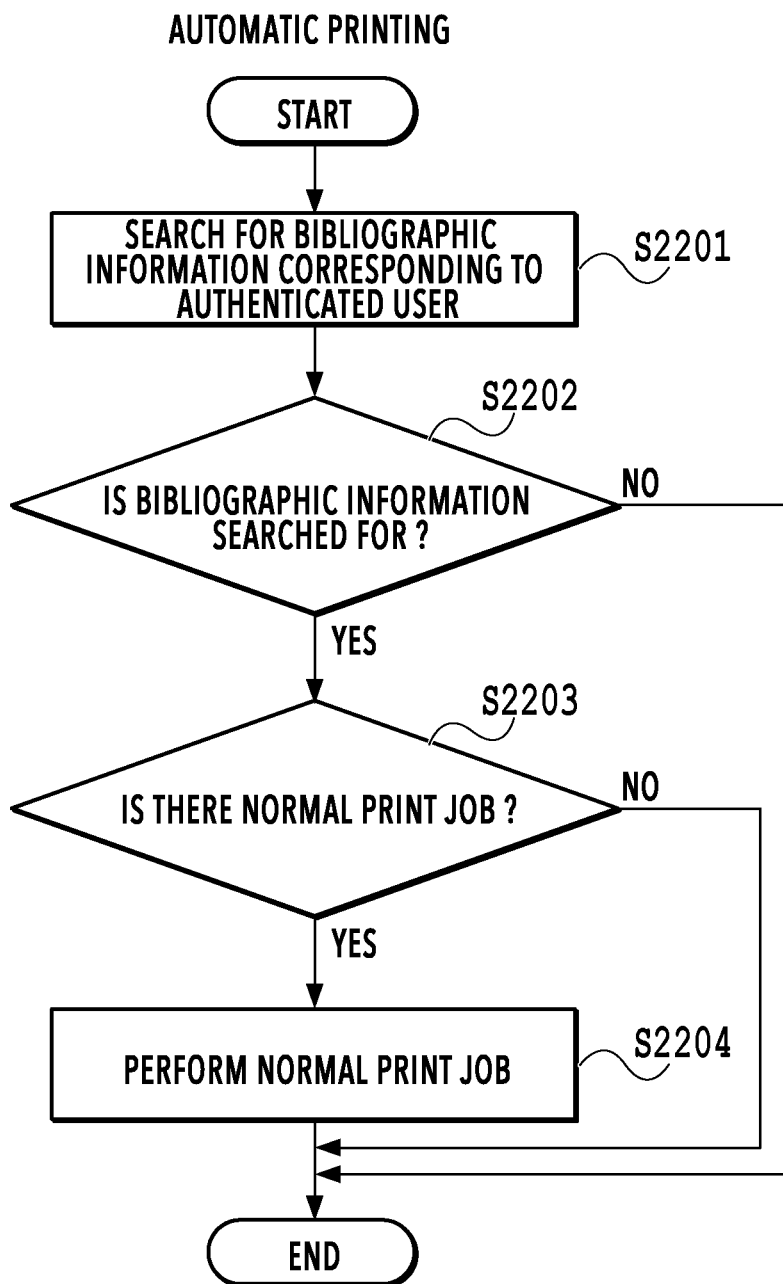
FIG. 22 is a flowchart showing a procedure of post-authentication automatic printing processing in the image forming apparatus.

At S2104, the job management unit 307 performs processing relating to the post-authentication automatic printing shown in FIG. 22. In the following, by using FIG. 22, post-authentication automatic printing processing is explained supplementally. At S2201, the job management unit 307 acquires the ID of a user authenticated at S2101 from the authentication unit 303. Then, by using the acquired ID (user name), the job management unit 307 searches for bibliographic information corresponding to the authenticated user from the bibliographic information list 2001.

At S2202, the job management unit 307 determines whether or not there is bibliographic information corresponding to the authentication user as a result of the search. In a case where there is bibliographic information corresponding to the authenticated user (Yes at S2202), the job management unit 307 advances the processing to S2203 and in a case where there is not bibliographic information corresponding to the authenticated user (No at S2202), the post-authentication automatic printing processing shown in FIG. 22 is terminated.

In a case where there is bibliographic information corresponding to the authenticated user in the bibliographic information list 2001, the job management unit 307 acquires the bibliographic information corresponding to the user. Specifically, for example, in a case where the user name of the authenticated user is User 1 in FIG. 20, the job management unit 307 acquires the bibliographic information of symbol 2009 to symbol 2012 from the bibliographic information list 2001.

At S2203, the job management unit 307 determines whether or not there is a normal print job in the acquired bibliographic information. In a case of determining that there is a normal print job (Yes at S2203), the job management unit 307 advances the processing to S2204 and in a case of determining that there is no normal print job (No at S2203), the post-authentication automatic printing processing shown in FIG. 22 is terminated.

At S2204, the job management unit 307 instructs the job control unit 308 to perform the normal print job included in the acquired bibliographic information and thus printing is performed. Specifically, for example, in case where the user name of the authenticated user is User 1 in FIG. 20, printing of the bibliographic information 2009 and the bibliographic information 2010 in the bibliographic information list 2001 is performed. In a case where execution of the normal print job included in the acquired bibliographic information is completed at S2204, the post-authentication automatic printing processing (that is, the processing at S2104 in FIG. 21) shown in FIG. 22 is terminated.

Figure 23:
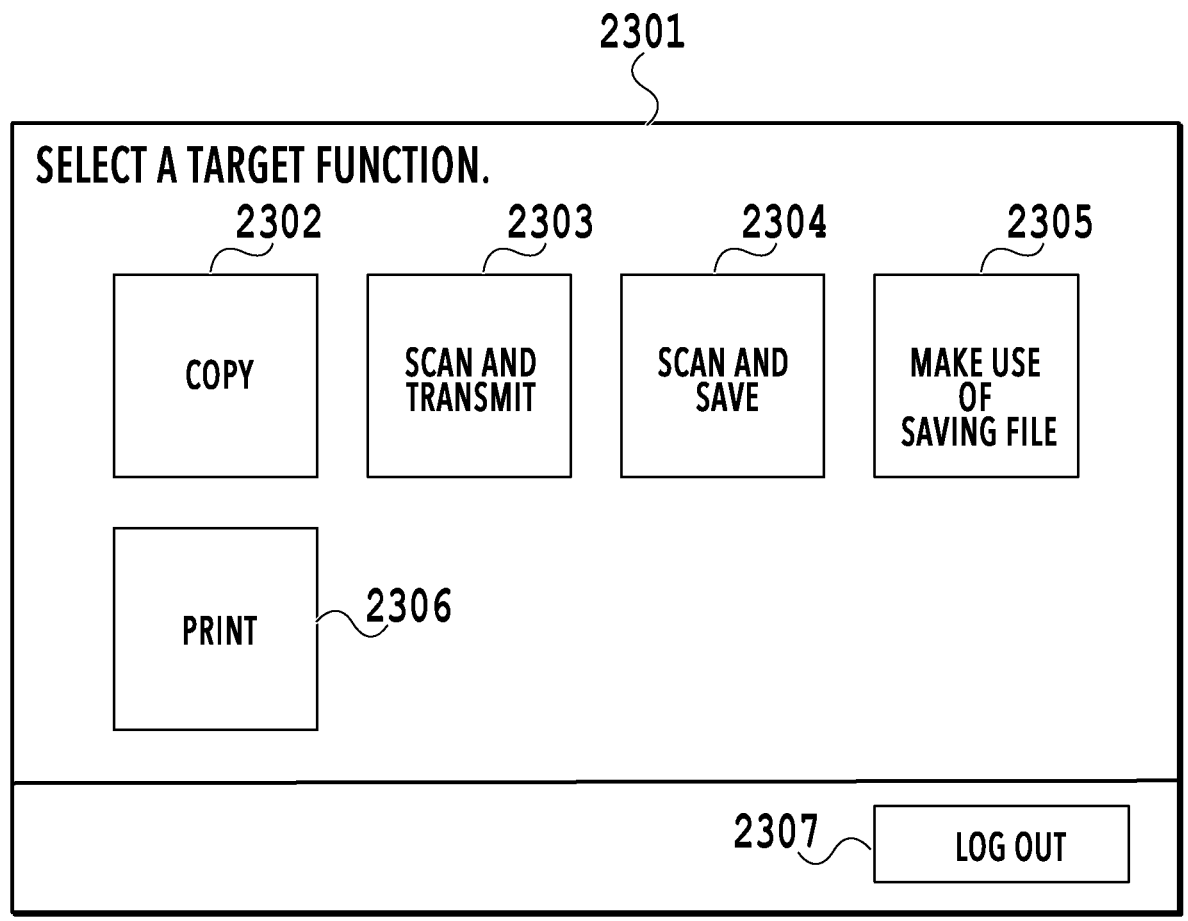
FIG. 23 is a diagram showing a function selection screen.

Explanation is returned to FIG. 21 again, at S2105, the UI control unit 302 causes the operation unit 207 to display a function selection screen 2301. In the following, by using FIG. 23, the function selection screen 2301 is explained supplementally.

On the function selection screen 2301, it is possible for a user to select a function the user desires to use. In a case where one of functions (buttons) of symbol 2302 to symbol 206 is selected by a user, the UI control unit 302 displays a function screen (not shown schematically) corresponding to each function. Further, in a case where a user selects Log out 2037, the authentication unit 303 performs log-out processing.

In a case where a user selects Print 2306 on the function selection screen 2301, the UI control unit 302 causes the operation unit 207 to display a print job list. Specifically, in a case where the post-authentication automatic printing is not performed at S2103 (No at S2103), on the operation unit 207, for example the print job list 1000 in FIG. 10 described above is displayed. On the other hand, in a case where the post-authentication automatic printing is performed at S2104 (Yes at S2103) and the print job list is displayed after that, on the operation unit 207, for example, the print job list screen 1100 in FIG. 11 described above is displayed. In this case, as a supplement, the normal print job has already been performed at S2104, and therefore, on the print job list screen 1100, only the encrypted secure print jobs 1101 and 1102 are displayed.

At S2106, the job management unit 307 determines whether there are printing instructions from a user. Then, in a case of determining that there are printing instructions from a user, the job management unit 307 advances the processing to S2107. Specifically, by a user selecting Print 2306 on the function selection screen 2301, the UI control unit 302 displays the print job list screen 1100 shown in FIG. 11 described above on the operation unit 207. Then, by a user selecting the encrypted secure print job 1101 or the encrypted secure print job 1102 on the displayed print job list screen 1100 and pressing down the Print start button 1103, printing instructions are performed.

At S2107, the job management unit 307 determines whether or not the print job whose printing instructions have been received is an encrypted secure print job. Then, in a case of determining that the print job whose printing instructions have been received is not an encrypted secure print job (No at S2107), the job management unit 307 advances the processing to S2109. Further, in a case of determining that the print job whose printing instructions have been received is an encrypted secure print job (Yes at S2017), the job management unit 307 advances the processing to S2108.

At S2108, the UI control unit 302 displays a password reception screen, not shown schematically, and receives the input of a password from a user. Then, in a case where a correct password is received from a user at S2108, the UI control unit 302 advances the processing to S2109. At S2109, the job management unit 307 instructs the job control unit 308 to perform the print job for which printing instructions have been given and thus printing processing is performed. Due to this, the printing processing shown in FIG. 21 is completed.

As above, in the present embodiment, in a case where the print setting that limits the automatic printing as described in FIG. 13A, FIG. 13C, FIG. 13E, FIG. 13G, FIG. 13I, and FIG. 13K (print setting having a possibility of bringing about trouble) is changed, it is possible to appropriately control the setting value for setting whether or not to perform the post-authentication automatic printing. Due to this, it is possible prevent an operation not intended by a user and improve the operability of a user.

Second Embodiment

In the present embodiment, another embodiment of the setting value change processing explained in FIG. 14 of the first embodiment described above is explained. In the following, explanation of the same configuration as that of the first embodiment is omitted and explanation is given by focusing attention mainly on points different from the first embodiment.

Figure 24:
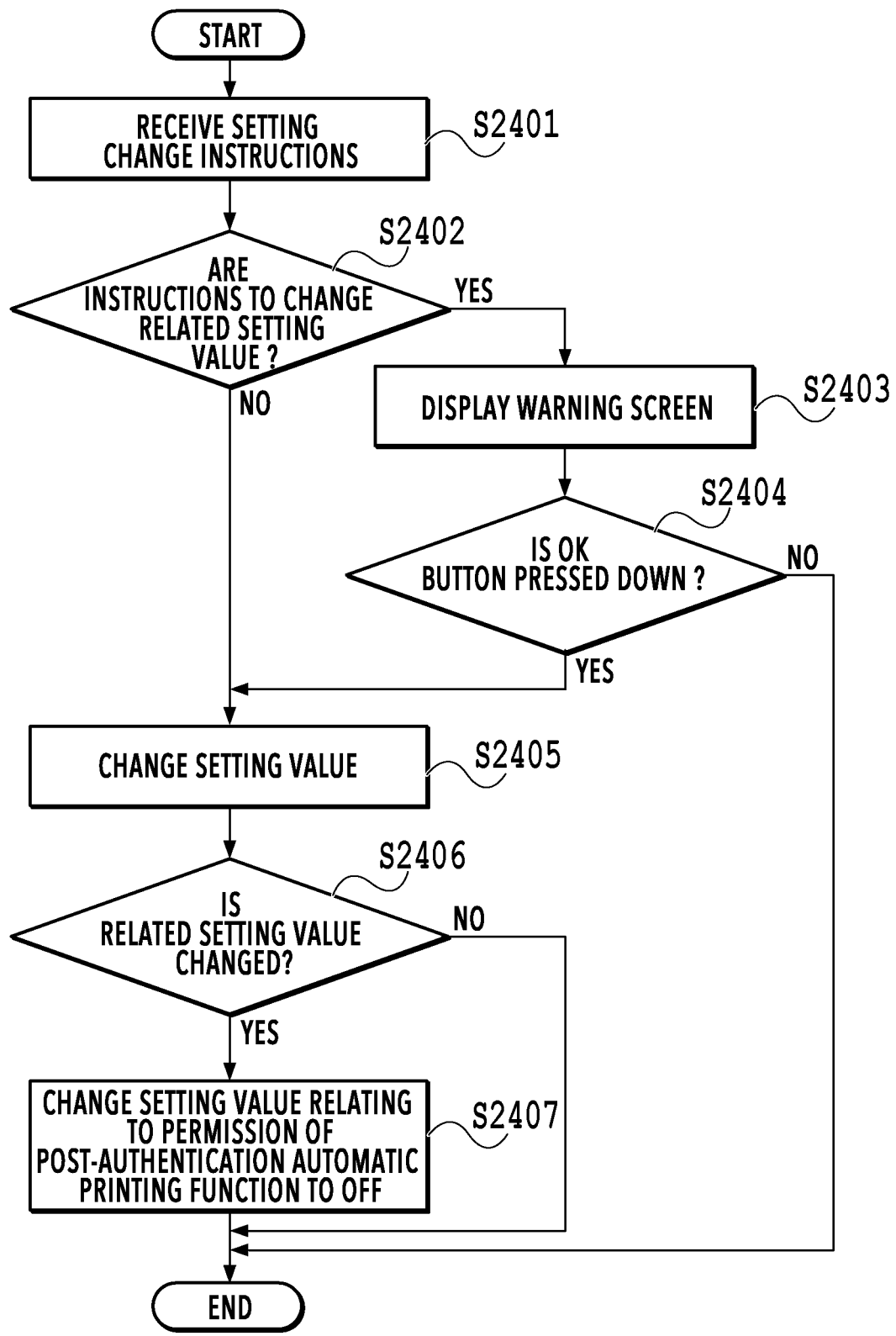
FIG. 24 is a flowchart showing a procedure of the setting value change processing in the image forming apparatus.

FIG. 24 explains the procedure of the setting value change processing of the image forming apparatus 102 according to the present embodiment. The setting value change processing shown in FIG. 24 is performed by the image forming apparatus 102 by the CPU 202 of the image forming apparatus 102 executing the system software 301.

At S2401, the UI control unit 302 receives setting change instructions from the administrator via the operation unit I/F 206 and transmits the setting change instructions to the data management unit 304.

At S2402, the data management unit 304 determines whether or not the setting change instructions received from the UI control unit 302 are instructions to change the setting value explained in FIG. 13B, FIG. 13D, FIG. 13F, FIG. 13H, FIG. 13J, and FIG. 13L described above so as to limit the post-authentication automatic printing. Specifically, the data management unit 304 determines whether or not the setting change instructions are instructions to change the following setting value.

(1) In a case where the setting value 1306 of the setting to receive only an encrypted secure print job in FIG. 13B is changed to the ON 1308

(2) In a case where the setting value 1316 of the setting to receive only a print job for which sharing is set in a department to which a user belongs in FIG. 13D is changed to the ON 1318

(3) In a case where the setting value 1326 to set whether or not it is possible to use the personal setting that can be set for each user in FIG. 13F is changed to the OFF 1327

(4) In a case where the setting value 1336 to set whether or not to perform charging processing for a print job in FIG. 13H is changed to the ON 1338

(5) In a case where the setting value 1346 to set whether or not to impose a print setting restriction on a print job in FIG. 13J is changed to the ON 1348

(6) In a case where the setting value 1356 to set whether or not to display a warning at the time of execution of a print job in FIG. 13L is changed to the ON 1358

In a case of determining that the setting change instructions are instructions to change the setting value explained in FIG. 13B, FIG. 13D, FIG. 13F, FIG. 13H, FIG. 13J, and FIG. 13L so as to limit the post-authentication automatic printing (Yes at S2402), the data management unit 304 advances the processing to S2403. Further, in a case of determining that the setting change instructions are not instructions to change the setting value explained in FIG. 13B, FIG. 13D, FIG. 13F, FIG. 13H, FIG. 13J, and FIG. 13L so as to limit the post-authentication automatic printing (No at S2402), the data management unit 304 advances the processing to S2405.

Figure 25:
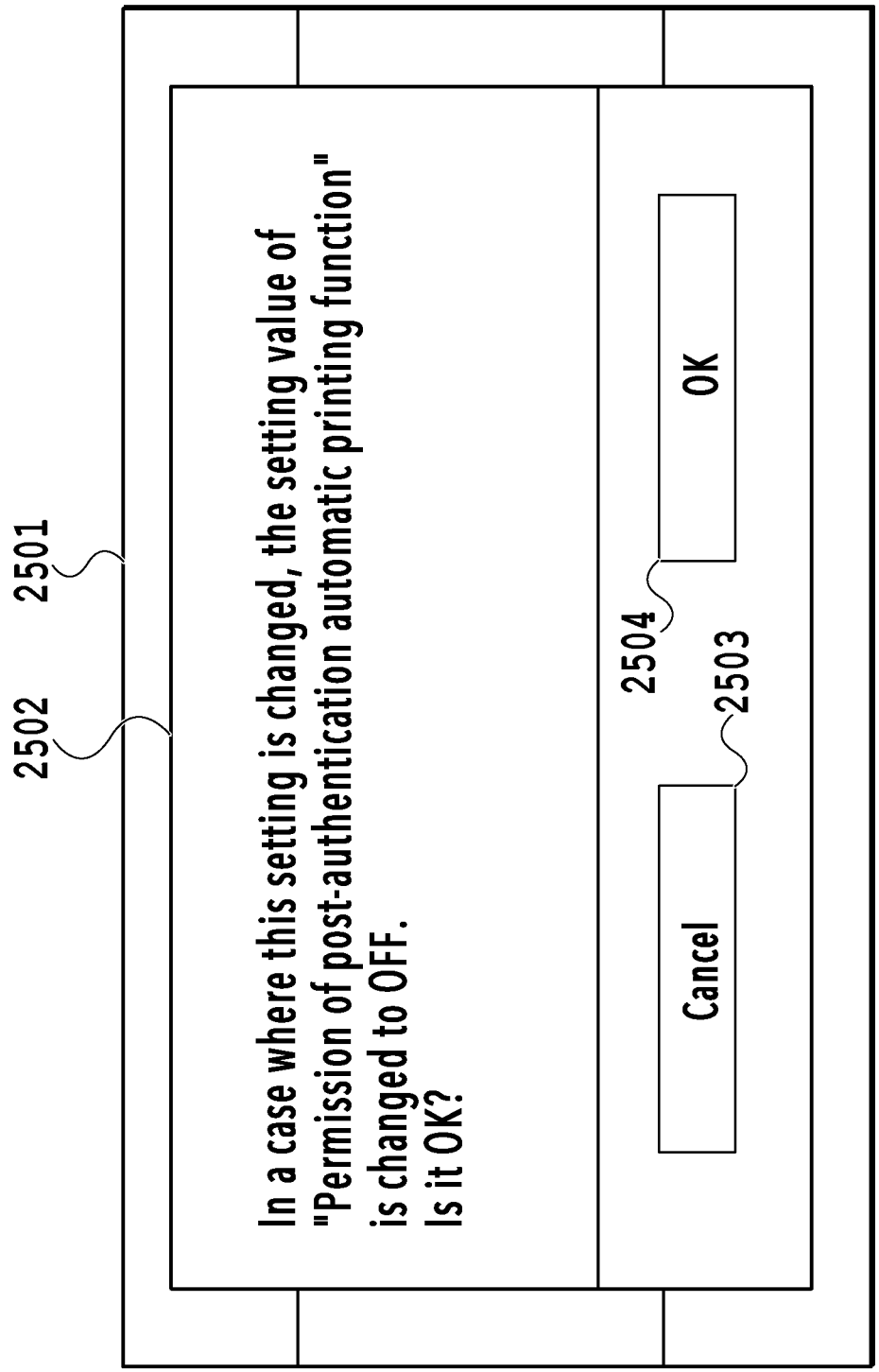
FIG. 25 is a diagram showing a warning display screen.

At S2403, the UI control unit 302 displays a warning display screen 2501 shown in FIG. 25 on the operation unit 207 via the operation unit I/F 206. In the following, by using FIG. 25, the warning display screen 2501 is explained supplementally.

On the warning display screen 2501, symbol 2502 is a warning message for the administrator and notifies the administrator that the setting value 711 (that is, the setting value relating to the permission of the post-authentication automatic printing function) shown in FIG. 7B described above is changed to the OFF 712. In a case where the administrator presses down a Cancel button 2503 on the warning display screen 2501, the setting change instructions at S2401 become invalid and in a case where the administrator presses down an OK button 2504, the setting change instructions at S2401 become valid.

In a case of determining that the OK button 2504 is pressed down at S2404 (Yes at S2404), the UI control unit 302 advances the processing to S2405. Further, in a case of determining that the Cancel button 2503 is pressed down (No at S2405), the UI control unit 302 terminates the setting change processing shown in FIG. 24. The processing at S2405 to S2407 in FIG. 24 is the same as the processing at S1402 to S1404 in FIG. 14, and therefore, explanation thereof is omitted here.

As above, in the present embodiment, in a case where the print setting that limits automatic printing as shown in FIG. 13B, FIG. 13D, FIG. 13F, FIG. 13H, FIG. 13J, and FIG. 13L is changed, a warning is displayed and in a case where permission is obtained by the administrator, the setting value relating to the permission of the post-authentication automatic printing function is controlled to OFF. Due to this, it is possible to prevent an operation not intended by a user and improve the operability of a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-203963 filed Oct. 30, 2018, which is hereby incorporated by reference wherein in its entirety.

What is claimed is:

1. A printing apparatus comprising:
an operation device;
one or more memories; and
one or more processors that execute a set of instructions to:
store, in the one or more memories, one of a setting of valid and a setting of invalid for a first function to perform printing processing of print data associated with the user without instructions from the user based on a success of authentication of the user;
store, in the one or more memories, one of a setting of valid and a setting of invalid for a second function to receive a print job with a password which is performed based on inputting the password via the operation device;
in a case where the setting of valid for the first function, perform control for making invalid or not making valid the setting of the second function; and
in a case where the setting of valid for the second function, perform control for making invalid or not making valid the setting of the first function.

2. The printing apparatus according to claim 1, wherein, according to execution of the setting of valid for the second function, the stored setting of valid for the first function is changed to the setting of invalid for the first function.

3. The printing apparatus according to claim 2, wherein the one or more processors further execute the set of the instructions to notify a user of changing the stored setting of valid for the first function to the setting of invalid for the first function according to receiving an instruction for executing the setting of valid for the second function from the user.

4. The printing apparatus according to claim 1, wherein, in a case where the setting of valid for the second function is stored, a display on a setting screen is produced so that the setting of invalid for the first function cannot be changed to the setting of valid for the first function.

5. A control method for a printing apparatus, the control method comprising:
storing, in the one or more memories, one of a setting of valid and a setting of invalid for a first function to perform printing processing of print data associated with the user without instructions from the user based on a success of authentication of the user;
storing, in the one or more memories, one of a setting of valid and a setting of invalid for a second function to receive a print job with a password which is performed based on inputting the password via the operation device of the printing apparatus;
in a case where the setting of valid for the first function, performing control for making invalid or not making valid the setting of the second function; and
in a case where the setting of valid for the second function, performing control for making invalid or not making valid the setting of the first function.

6. A non-transitory computer readable storage medium on which is stored a computer program for making a computer execute a control method for a control method for a printing apparatus, the control method comprising:
storing, in the one or more memories, one of a setting of valid and a setting of invalid for a first function to perform printing processing of print data associated with the user without instructions from the user based on a success of authentication of the user;
storing, in the one or more memories, one of a setting of valid and a setting of invalid for a second function to receive a print job with a password which is performed based on inputting the password via the operation device of the printing apparatus;
in a case where the setting of valid for the first function, performing control for making invalid or not making valid the setting of the second function; and
in a case where the setting of valid for the second function, performing control for making invalid or not making valid the setting of the first function.

* * * * *